(12) United States Patent
Matsuzaki et al.

(10) Patent No.: US 7,348,708 B2
(45) Date of Patent: Mar. 25, 2008

(54) DRIVE METHOD FOR PIEZOELECTRIC ACTUATOR, DRIVE APPARATUS FOR PIEZOELECTRIC ACTUATOR, ELECTRONIC DEVICE, CONTROL PROGRAM FOR DRIVE APPARATUS FOR PIEZOELECTRIC ACTUATOR, AND RECORDING MEDIUM

(75) Inventors: Jun Matsuzaki, Shiojiri (JP); Takashi Kawaguchi, Shiojiri (JP); Reiko Nagahama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/178,462

(22) Filed: Jul. 12, 2005

(65) Prior Publication Data

US 2006/0006762 A1    Jan. 12, 2006

(30) Foreign Application Priority Data

Jul. 12, 2004  (JP) ............................. 2004-204713

(51) Int. Cl.
*H01L 41/09*    (2006.01)

(52) U.S. Cl. ..................................... 310/317

(58) Field of Classification Search .................. 310/317
See application file for complete search history.

(56) References Cited

U.S. PATENT DOCUMENTS 6,229,245 B1 *  5/2001  Kitani .................. 310/316.02
6,515,941 B1 *  2/2003  Suzuki et al. ................. 368/28
6,727,635 B2 *  4/2004  Okamoto et al. ....... 310/316.01
2004/0017131 A1 *  1/2004  Sawada et al. ............. 310/311
2005/0068989 A1 *  3/2005  Herbert et al. .............. 370/506
2005/0092088 A1 *  5/2005  Blakley ....................... 73/582

FOREIGN PATENT DOCUMENTS

| JP | 59148583 A | 8/1984 |
|----|------------|--------|
| JP | 1005378 A | 1/1989 |
| JP | 1114379 A | 5/1989 |
| JP | 4322179 A | 11/1992 |
| JP | 5191985 A | 7/1993 |

* cited by examiner

*Primary Examiner*—Darren Schuberg
*Assistant Examiner*—Derek Rosenau
(74) *Attorney, Agent, or Firm*—Global IP Counselors, LLP

(57) ABSTRACT

The frequency of a drive signal supplied to a piezoelectric actuator 91 is swept within a specific range, the consumption current of the piezoelectric actuator 91 is determined, and when the consumption current is equal to or greater than a reference value, the frequency of the drive signal supplied to the piezoelectric actuator 91 is shifted proportionate to a specific frequency and returned to its initial value, and the frequency sweep is continued. The resonance frequency component can be removed when the frequency of the drive signal supplied to the piezoelectric element is swept. Consequently, the piezoelectric element can be driven outside of the resonance frequency range at which the consumption current is highest, allowing extreme increases in the consumption current to be prevented and system failures due to the flow of an excessive consumption current to be avoided.

23 Claims, 14 Drawing Sheets

DRIVE METHOD FOR PIEZOELECTRIC ACTUATOR, DRIVE APPARATUS FOR PIEZOELECTRIC ACTUATOR, ELECTRONIC DEVICE, CONTROL PROGRAM FOR DRIVE APPARATUS FOR PIEZOELECTRIC ACTUATOR, AND RECORDING MEDIUM

CROSS-REFERENCE TO RELATED APPLICATIONS

This application claims priority to Japanese Patent Application No. 2004-204713. The entire disclosure of Japanese Patent Application No. 2004-204713 is hereby incorporated herein by reference.

BACKGROUND OF THE INVENTION

1. Field of the Invention

The present invention generally relates to a drive method for a piezoelectric actuator. More specifically, the present invention relates to a drive method for a piezoelectric actuator, a drive apparatus for a piezoelectric actuator, an electronic device, a control program for a drive apparatus for a piezoelectric actuator, and a recording medium.

2. Background Information

Piezoelectric elements have an excellent conversion ratio of electrical energy to mechanical energy, and also have excellent responsiveness. Various piezoelectric actuators that utilize the piezoelectric effects of piezoelectric elements have therefore been recently under development. These piezoelectric actuators are applied to a field that includes various electronic devices, such as piezoelectric buzzers, inkjet heads in printers, ultrasonic motors, electronic timepieces, and portable devices.

However, in piezoelectric actuators, since the resonance frequency fluctuates due to the influence of the surrounding temperature, the load, and the like, the frequency of the drive signal capable of driving the piezoelectric actuator also fluctuates according to the surrounding temperature, the load, and the like. Therefore, systems are known in which the frequency of the drive signal is swept or varied within a wide range that includes the frequency range of the fluctuating drive signal, and the motor is reliably driven. Such a system is shown in Examined Patent Application (Kokoku) No. 5-16272, which is hereby incorporated by reference.

Specifically, in Examined Patent Application (Kokoku) No. 5-16272, the sweep voltage of a triangular wave or a sawtooth wave is outputted to a voltage control oscillator, the oscillation frequency of the voltage control oscillator is constantly varied within a range of $f_L$ to $f_H$, and a frequency wherein a piezoelectric vibrating element can be driven can always be ensured. This structure makes it possible to drive reliably the piezoelectric vibrating element (piezoelectric actuator).

Examined Patent Application (Kokoku) No. 5-16272 includes a description of driving at a resonance frequency. The impedance of the piezoelectric element abruptly decreases near the resonance point, and is the lowest at the resonance point. Therefore, the consumption current of the piezoelectric element (piezoelectric actuator) grows extremely large when the piezoelectric element is driven at the resonance frequency, and depending on the situation, the power source voltage may suddenly decrease, causing the system to fail.

In view of the above, it will be apparent to those skilled in the art from this disclosure that there exists a need for an improved drive method for a piezoelectric actuator, a drive apparatus for a piezoelectric actuator, an electronic device having the actuator, a control program for a drive apparatus for a piezoelectric actuator, and a recording medium. This invention addresses this need in the art as well as other needs, which will become apparent to those skilled in the art from this disclosure.

SUMMARY OF THE INVENTION

An object of the present invention is to provide a drive method for a piezoelectric actuator, a drive apparatus for a piezoelectric actuator, an electronic device having this piezoelectric actuator, a control program for a drive apparatus for a piezoelectric actuator, and a recording medium on which this control program is recorded.

A drive method for a piezoelectric actuator according to a first aspect of the present invention uses a piezoelectric actuator having a vibrating body that is vibrated by the application of a drive signal having a specific frequency to a piezoelectric element, and a contact section provided on the vibrating body and pressed against the drive object. The frequency of the drive signal supplied to the piezoelectric element is swept within a specific range. Further, and the frequency of the drive signal is shifted by a specific frequency and the frequency sweep is continued when the consumption current of the piezoelectric element is determined and found to be equal to or greater than a reference value.

In the present invention, the consumption current is preferably monitored, and when this consumption current is equal to or greater than a set reference value, the frequency of the drive signal is shifted by a specific frequency of several kilohertz, for example. Therefore, the resonance frequency component can be removed when the frequency of the drive signal supplied to the piezoelectric element is swept or varied. Therefore, since the piezoelectric element is driven without the resonance frequency component in which the consumption current is highest, extreme increases in the consumption current can be prevented. Further, since increases in the consumption current can be prevented, system failures due to the flowing of an excessive consumption current can be avoided.

The drive method for a piezoelectric actuator according to a second aspect of the present invention uses a piezoelectric actuator having a vibrating body that is vibrated by the application of a drive signal having a specific frequency to a piezoelectric element, and a contact section provided on the vibrating body and pressed against the drive object. The frequency of the drive signal supplied to the piezoelectric element is swept within a specific range, and the frequency of the drive signal is returned to the initial value and the frequency sweep is continued when the consumption current of the piezoelectric element is determined and found to be equal to or greater than a reference value.

In this aspect of the present invention, the consumption current is preferably monitored, and when this consumption current is equal to or greater than a set reference value, the frequency of the drive signal is returned to the initial value, such as the maximum value, after being swept from the maximum value of a specific frequency range to the minimum value. Therefore, the resonance frequency component can be removed when the frequency of the drive signal supplied to the piezoelectric element is swept or varied. Therefore, since the piezoelectric element is driven without the resonance frequency component in which the consumption current is highest, extreme increases in the consumption current can be prevented. Further, since increases in the consumption current can be prevented, system failures due to the flowing of an excessive consumption current can be avoided.

Furthermore, in each aspect of the present invention, since the frequency of the drive signal is swept or varied within a specific range, the piezoelectric element can be reliably driven if it is driven within this frequency range.

Moreover, since the drive signal is constantly swept within a specific frequency range, the drive frequency of the piezoelectric element may be nonuniform due to fluctuations in the surrounding temperature, noise, and load, but it is possible to overcome such nonuniformities without making adjustments. Therefore, there is no need to provide the drive apparatus with a determination circuit for determining fluctuations in the surrounding temperature, noise, and load, or an adjustment circuit for adjusting the frequency of the drive signal on the basis of such determined data, and the configuration of the drive apparatus can be simplified.

A drive method for a piezoelectric actuator according to a third aspect of the present invention is the method of the first or second aspect, wherein it is preferable that the reference value is configured to be capable of being switched among a plurality of levels. It is also preferable that the amount of shifting be set according to the selected reference value when the frequency of the drive signal is shifted by a specific frequency.

If the reference value is configured to be capable of being switched among a plurality of levels, then switching the reference value makes it possible to control the driven speed of the piezoelectric actuator and to control the limit on the consumption current. Specifically, if the reference value of the consumption current decreases, the frequency of the drive signal that has reached the reference value is far from the resonance frequency, and driving in areas where the amount of vibration displacement of the piezoelectric element is reduced in a proportional manner at the resonance frequency or a nearby frequency. Therefore, if the reference value is reduced, the driven speed and consumption current of the piezoelectric actuator are reduced, and if the reference value is increased, the driven speed and consumption current of the piezoelectric actuator can be increased to allow the driven speed and consumption current to be controlled by switching the reference value.

A drive method for a piezoelectric actuator according to a fourth aspect of the present invention is the method of any one of the first through third aspects, wherein it is preferable that a determination signal to express the vibrating state of the vibrating member is detected, and a driven state in which the vibrating member vibrates to drive the drive object, or a resting state in which the drive object is not driven is determined based on this determination signal, and when the drive object is in a driven state, the sweep speed of the frequency of the drive signal is compared with the speed when the drive object is in a resting state and is set to a lower speed.

With such a configuration, the unproductive drive signal output time in which the drive object cannot be driven can be shortened, needless consumption currents can be reduced, and efficiency can be improved. Further, since the time of the no-drive state can be shortened, nonuniformities in the driving time over a specific amount of time (for example, one minute) can be reduced, deviations (nonuniformities) in the driving speed of the driven member (drive object) that is driven by the vibrating body can also be reduced, and high speed driving can be achieved, even with fluctuations in the load or the like.

Further, since the sweep speed of the frequency of the drive signal can be switched in the driven state or resting state of the drive object, the adjustment process is simple and the configuration of the control circuits and the like to adjust the speed can also be simplified.

The sweep speed of the frequency of the drive signal should be set to a lower speed at least when the drive object is in the driven state than when it is in the no-drive state, and the speed during the driven state may be set to one level or may be varied among a plurality of levels. In the driven state, if the sweep speed of the frequency of the drive signal can be varied among a plurality of levels, more effective control is made possible by lowering the frequency sweep speed to a state in which the piezoelectric can be effectively driven.

The drive apparatus for a piezoelectric actuator according to a fifth aspect of the present invention has a structure such that a drive signal is supplied to a piezoelectric element in a piezoelectric actuator having a vibrating body that vibrates due to the application of a drive signal having a specific frequency to a piezoelectric element, and a contact section provided on the vibrating body and pressed against the drive object. The drive apparatus for a piezoelectric actuator further includes a frequency control device to sweep the frequency of the drive signal supplied to the piezoelectric element within a specific range, wherein the frequency control device shifts the frequency of the drive signal by a specific frequency and continues the frequency sweep when the consumption current of the piezoelectric element is determined and found to be equal to or greater than a reference value.

In the present invention, the consumption current is preferably monitored using the frequency control device, and when the consumption current is equal to or greater than a set reference value, the frequency of the drive signal is shifted by a specific frequency of several kilohertz, for example. Therefore, the resonance frequency component can be removed when the frequency of the drive signal supplied to the piezoelectric element is swept or varied. For this reason, the piezoelectric element is driven without the resonance frequency component in which the consumption current is highest, and extreme increases in the consumption current can therefore be prevented. Further, since increases in the consumption current can be prevented, system failures due to the flowing of an excessive consumption current can be avoided.

A drive apparatus for a piezoelectric actuator according to a sixth aspect of the present invention has a structure such that a drive signal is supplied to a piezoelectric element in a piezoelectric actuator having a vibrating body that vibrates due to the application of a drive signal having a specific frequency to a piezoelectric element, and a contact section provided on the vibrating body and pressed against the drive object. The drive apparatus for a piezoelectric actuator further includes a frequency control device to sweep the frequency of the drive signal supplied to the piezoelectric element within a specific range, wherein the frequency control device returns the frequency of the drive signal to the initial value and continues the frequency sweep when the consumption current of the piezoelectric element is determined and found to be equal to or greater than a reference value.

In the present invention, the consumption current is preferably monitored, and when this consumption current is equal to or greater than a set reference value, the frequency of the drive signal is returned to the initial value, such as the maximum value, after being swept from the maximum value of a specific frequency range to the minimum value. Therefore, the resonance frequency component can be removed when the frequency of the drive signal supplied to the piezoelectric element is swept or varied. For this reason, the piezoelectric element is driven without the resonance frequency component in which the consumption current is highest, and extreme increases in the consumption current can therefore be prevented. Further, since increases in the consumption current can be prevented, system failures due to the flowing of an excessive consumption current can be avoided.

Furthermore, in each aspect of the present invention, since the frequency of the drive signal is preferably swept or varied within a specific range, the piezoelectric element can be reliably driven if it is driven within this frequency range.

Moreover, since the drive signal is constantly swept within a specific frequency range, the drive frequency of the piezoelectric element may be nonuniform due to fluctuations in the surrounding temperature, noise, and load, but it is possible to overcome such nonuniformities without making adjustments. Therefore, there is no need to provide the drive apparatus with a determination circuit for determining fluctuations in the surrounding temperature, noise, and load, or an adjustment circuit for adjusting the frequency of the drive signal on the basis of such determined data, and the configuration of the drive apparatus can be simplified.

A drive apparatus for a piezoelectric actuator according to a seventh aspect of the present invention is the apparatus of the fifth or sixth aspect, wherein it is preferable that the frequency control device is configured to be capable of switching the reference value among a plurality of levels.

If the reference value is configured to be capable of being switched among a plurality of levels, switching the reference value makes it possible to control the driven speed of the piezoelectric actuator and to control the limit on the consumption current.

A drive apparatus for a piezoelectric actuator according to an eighth aspect of the present invention is the apparatus of any one of the fifth to seventh aspects, wherein it is preferable that the frequency control device detects a determination signal to express the vibrating state of the vibrating member, and determines a driven state in which the vibrating member vibrates to drive the drive object, or a resting state in which the drive object is not driven, on the basis of the determination signal. Further, when the drive object is in a driven state, the sweep speed of the frequency of the drive signal is compared with the speed when the drive object is in a resting state and is set to a lower speed.

With such a configuration, the unproductive drive signal output time in which the drive object cannot be driven can be shortened, needless consumption currents can be reduced, and efficiency can be improved. Further, since the time of the no-drive state can be shortened, nonuniformities in the driving time over a specific amount of time (for example, one minute) can be reduced, deviations (nonuniformities) in the driving speed of the driven member (drive object) that is driven by the vibrating body can also be reduced, and high speed driving can be achieved, even with fluctuations in the load or the like.

A drive apparatus for a piezoelectric actuator according to a ninth aspect of the present invention is the apparatus of any one of the fifth to eighth aspects, wherein it is preferable that the frequency control device is configured to have a constant voltage circuit, an electric current determination circuit, a voltage adjustment circuit, and a variable frequency oscillator. The constant voltage circuit output a standard voltage for electric current determination to determine whether the consumption current is equal to or greater than a reference value. The electric current determination circuit converts the consumption current to a voltage value, compares the voltage value with the standard voltage for electric current determination, and outputs a comparison result signal. The voltage adjustment circuit adjusts the outputted voltage on the basis of the comparison result signal. The variable frequency oscillator is capable of varying the frequency of the outputted signal by way of the voltage outputted from the voltage adjustment circuit.

In the drive apparatus with this configuration, comparing the reference value for the electric current determination outputted from the constant voltage circuit with a voltage value based on the consumption current value of the piezoelectric element makes it possible to determine whether the consumption current is equal to or greater than the reference value; that is, whether the current is near the resonance point, and to output a comparison result signal. The frequency of the drive signal is then shifted by a specific frequency by controlling the voltage value outputted from the voltage adjustment circuit on the basis of the comparison result signal, and the frequency is returned to its initial value. The frequency of the drive signal can therefore be controlled easily and with high precision.

A drive apparatus for a piezoelectric actuator according to a tenth aspect of the present invention is the apparatus of the ninth aspect, wherein it is preferable that the voltage adjustment circuit has a clock circuit to output a clock signal, an up/down counter, a digital/analog converter to set the voltage value of the outputted voltage on the basis of the counter value of the up/down counter, and a control circuit to control the counter value of the up/down counter on the basis of the clock signal. Further, the control circuit varies the counter value of the up/down counter on the basis of the comparison result signal.

According to the drive apparatus with this configuration, the frequency of the drive signal can be controlled if the counter value of the up/down counter is controlled by the control circuit. Therefore various controls are easily achieved, such as sweep control of the frequency, shift control, and reset control to return the frequency to the initial value.

An electronic device according to an eleventh aspect of the present invention has a piezoelectric actuator with a vibrating body that vibrates due to the application of a drive signal having a specific frequency to a piezoelectric element, and a contact section provided on the vibrating body and pressed against the drive object. The electronic device also has a drive apparatus according to any one of the fifth to tenth aspects.

In the electronic device with this configuration, since a piezoelectric actuator is included whereby the consumption current can be suppressed and system failures can be prevented, an electronic device particularly suitable for wristwatches and other such compact and portable devices can be provided.

A control program for a drive apparatus for a piezoelectric actuator according to a twelfth aspect of the present invention is provided for a drive apparatus for a piezoelectric actuator in which a drive signal is supplied to a piezoelectric element in a piezoelectric actuator having a vibrating body that vibrates due to the application of a drive signal having a specific frequency to the piezoelectric element, and a contact section provided on the vibrating body and pressed against the drive object. Further, a computer incorporated into the drive apparatus is made to function as a frequency control device to sweep the frequency of the drive signal supplied to the piezoelectric element within a specific range, to shift the frequency of the drive signal by a specific frequency, and to continue the frequency sweep when the consumption current of the piezoelectric element is determined and found to be equal to or greater than a reference value.

A control program for a drive apparatus for a piezoelectric actuator according to a thirteenth aspect of the present invention is provided for a drive apparatus for a piezoelectric actuator in which a drive signal is supplied to a piezoelectric element in a piezoelectric actuator having a vibrating body that vibrates due to the application of a drive signal having a specific frequency to the piezoelectric element, and a contact section provided to the vibrating body and pressed against the drive object. Further, a computer incorporated into the drive apparatus is made to function as a frequency control device to sweep the frequency of the drive signal supplied to the piezoelectric element within a specific range, to return the frequency of the drive signal to the initial value, and to continue the frequency sweep when the consumption current of the piezoelectric element is determined and found to be equal to or greater than a reference value.

A recording medium according to a fourteenth aspect of the present invention is capable of being read by a computer, in which the aforementioned control programs of the twelfth and/or thirteenth aspects are recorded.

According to these aspects, allowing the computer incorporated into the drive apparatus to function as the aforementioned devices makes it possible to reduce the consumption current of the piezoelectric actuator and to prevent system failures, as previously described. If the devices are configured from a computer, conditions can be easily varied merely by changing the program, and appropriate control according to the drive object and the like can therefore be performed.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First, an electronic device having a date display mechanism driven by a piezoelectric actuator will be given as an example of an embodiment of the electronic device.

1. Overall Configuration

Figure 1:
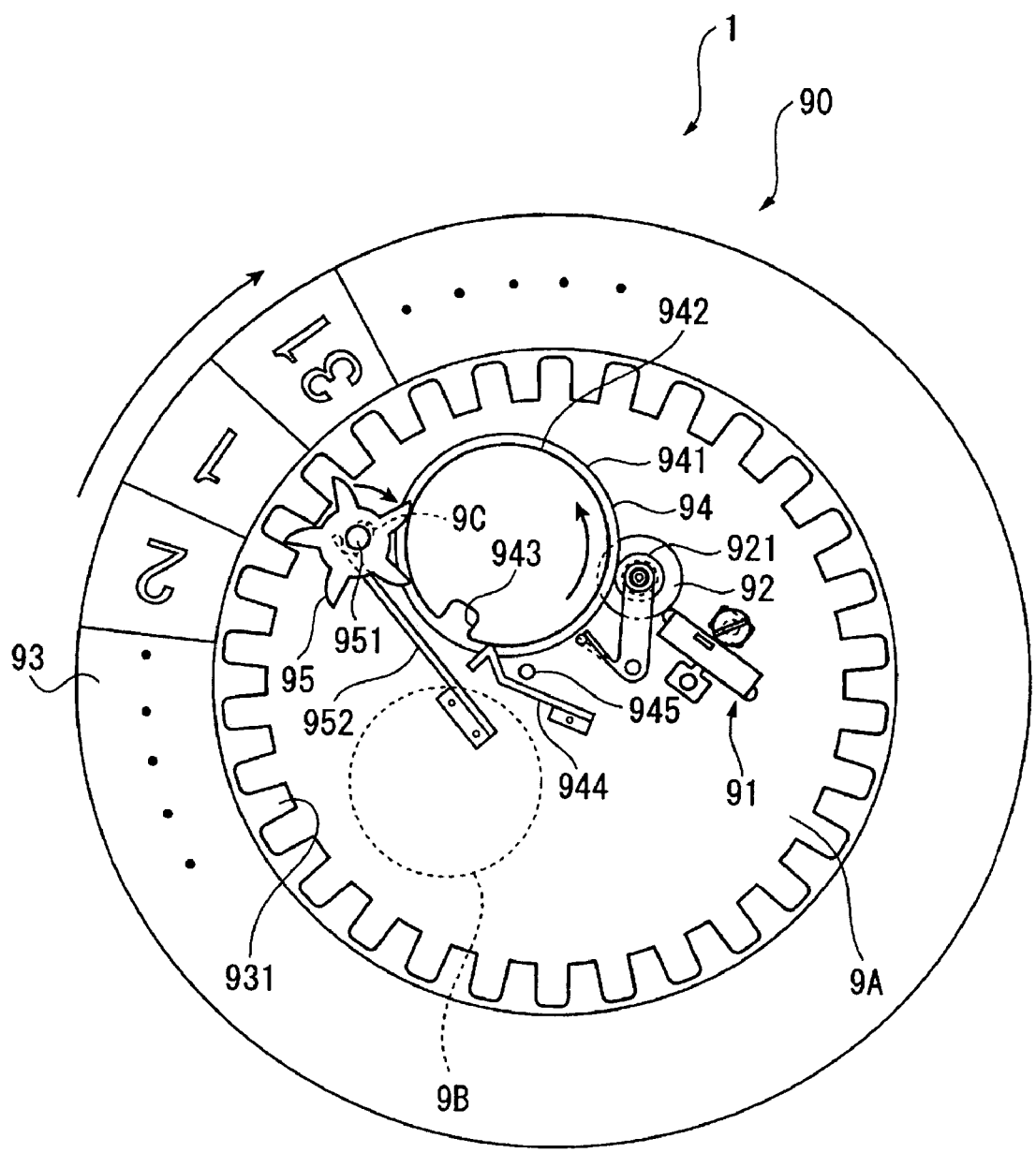
FIG. 1 is a plan view showing the main configuration of a date display mechanism in an electronic timepiece according to a first preferred embodiment of the present invention.

FIG. 1 is a plan view showing a date display mechanism 90 of an electronic timepiece 1 according to a first preferred embodiment of the present embodiment. In FIG. 1, the main section of the date display mechanism 90 is primarily configured from a piezoelectric actuator 91, a rotor 92 as the drive object rotatably driven (driven member) by the piezoelectric actuator 91, a deceleration gear train that decelerates and transmits the rotation of the rotor 92, and a date wheel 93 rotated by the drive force transmitted via the deceleration gear train. The deceleration gear train has a date turning intermediate wheel 94 and a date turning wheel 95. The piezoelectric actuator 91, the rotor 92, the date turning intermediate wheel 94, and the date turning wheel 95 are supported on a bottom plate 9A.

A disc-shaped dial (not shown) is provided on the top of the date display mechanism 90, and part of the outer peripheral surface of the dial is provided with a window to display the date, and is designed so that the date on the date wheel 93 is visible through the window. Further, a pointer movement gear train (not shown) connected to the stepping motor to drive the pointers, and a secondary battery 9B as a power source are provided on the bottom (reverse side) of the bottom plate 9A. The secondary battery 9B supplies power to the circuits of the stepping motor, the piezoelectric actuator 91, and a voltage application apparatus (not shown). The structure may also be such that a power generator that generates power by utilizing solar power or the rotation of an oscillating weight is connected to the secondary battery 9B, and the power generated by this power generator is charged to the secondary battery 9B. Further, the power source is not limited to a secondary battery 9B that is charged by a power generator, and may be a common primary battery (for example, a lithium ion battery).

The date turning intermediate wheel 94 is configured from a large wheel 941 and a small wheel 942. The small wheel 942 has a cylindrical shape somewhat smaller than the large wheel 941, and a notch 943 with a substantial square shape is formed in the outer peripheral surface thereof. The small wheel 942 is fixed in place to have the same center as the large wheel 941. A gear 921 at the top of the rotor 92 meshes with the large wheel 941. Therefore, the date turning intermediate wheel 94 composed of the large wheel 941 and small wheel 942 rotates in conjunction with the rotation of the rotor 92.

A plate spring 944 is provided on the bottom plate 9A on the side of the date turning intermediate wheel 94. The proximal end of the plate spring 944 is fixed in place on the bottom plate 9A, and the distal end is bent into a rough V shape. The distal end of the plate spring 944 is arranged to be capable of going into and out of the notch 943 of the date turning intermediate wheel 94. A contact element 945 is disposed at a position near the plate spring 944, and this contact element 945 is designed to come into contact with the plate spring 944 when the date turning intermediate wheel 94 rotates and the distal end of the plate spring 944 goes into the notch 943. A specific voltage is applied to the plate spring 944, and when the plate spring 944 comes into contact with the contact element 945, this voltage is applied to the contact element 945 as well. Therefore, the state in which the date wheel is turned can be determined by determining the voltage of the contact element 945, and the amount by which the date wheel 93 rotates in one day can be determined.

Determining the amount by which the date wheel 93 rotates is not limited to using the plate spring 944 or the contact element 945, and it is possible to use devices in which the rotating state of the rotor 92 or the date turning intermediate wheel 94 is determined and a specific pulse signal is outputted. Specifically, it is possible to use a conventional photoreflector, photointerrupter, MR sensor, or other such rotation encoder or the like.

The date wheel 93 has a ring shape, and an inner gear 931 is formed on the inner peripheral surface thereof. The date turning wheel 95 has a gear preferably having five teeth and meshes with the inner gear 931 of the date wheel 93. Further, a shaft 951 is provided in the center of the date turning wheel 95, and this shaft 951 is inserted into a through-hole 9C formed in the bottom plate 9A. The through-hole 9C is formed extending along the peripheral direction of the date wheel 93. The date turning wheel 95 and the shaft 951 are urged upward and to the right in FIG. 1 by a plate spring 952 fixed on the bottom plate 9A. The date wheel 93 is also prevented from oscillating by the urging action of the plate spring 952.

Figure 2:
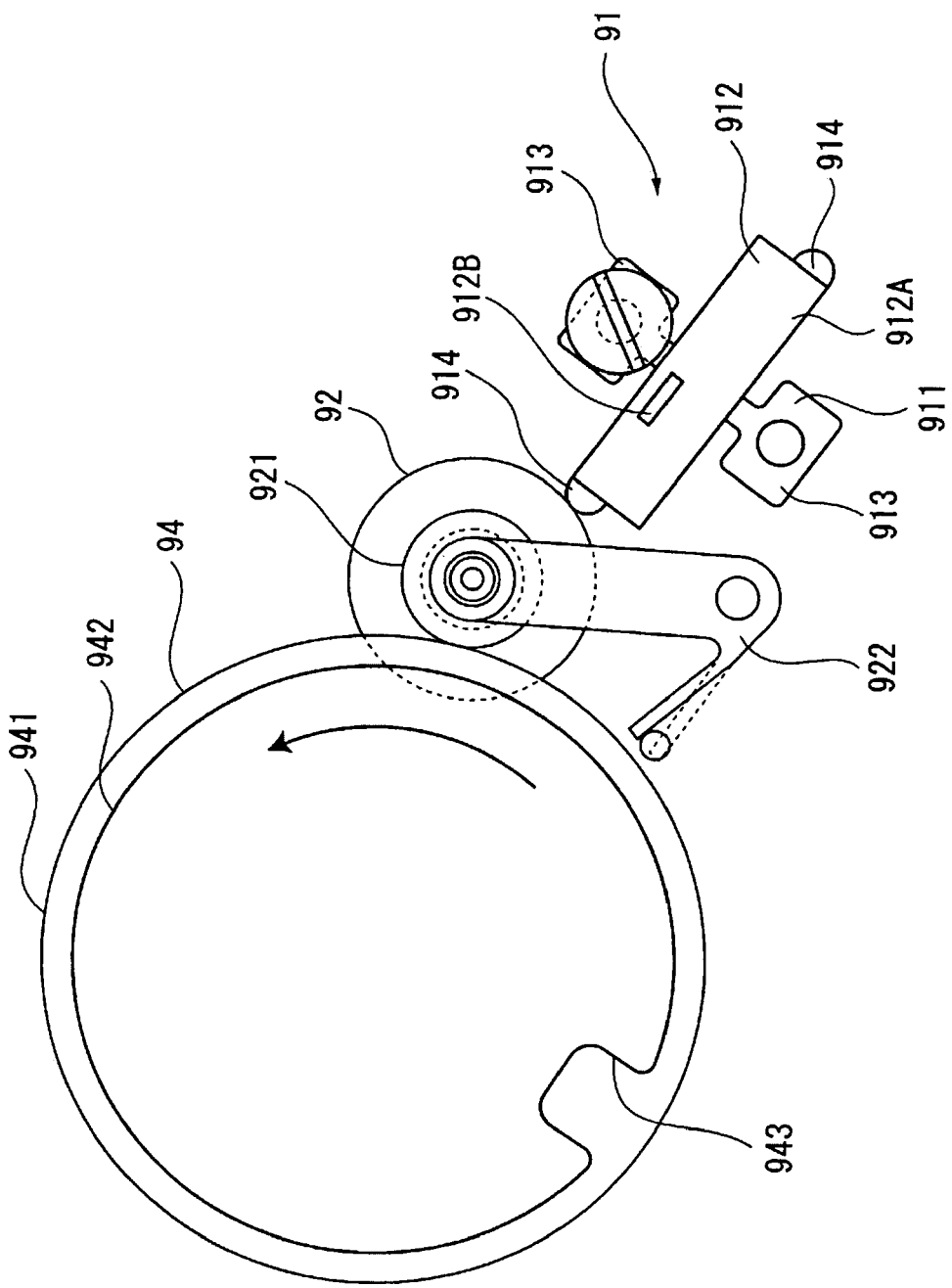
FIG. 2 is a plan view showing a piezoelectric actuator used in the electronic timepiece.

FIG. 2 shows an enlarged view of the piezoelectric actuator 91 and the rotor 92. As shown in FIG. 2, the piezoelectric actuator 91 has a substantially rectangular reinforcing plate 911, and a piezoelectric element 912 bonded to both sides of the reinforcing plate 911. In other words, the piezoelectric element 912 interposes the reinforcing plate 911. Arm sections 913 that protrude from both sides are formed near the center of the reinforcing plate 911 in the longitudinal direction, and one of these arm sections 913 is fixed in place on the bottom plate 9A by screws or the like. The other arm section 913 is not fixed to the bottom plate 9A, but remains in a free state and constitutes a weight that provides oscillation balance when the piezoelectric actuator 91 oscillates.

Substantially hemispherical convexities 914 that protrude along the longitudinal direction of the reinforcing plate 911 are formed at both ends of the diagonal of the reinforcing plate 911. One of these convexities 914 comes in contact with the side of the rotor 92.

The piezoelectric element 912 is formed into a substantially rectangular shape, and is bonded to the substantially rectangular sections on both sides of the reinforcing plate 911. Electrodes are formed from a plating layer on both sides of the piezoelectric element 912. A substantially rectangular determination electrode 912B is formed in the surface of the piezoelectric element 912 by insulating the plating layer with a groove. This determination electrode 912B is formed nearer to the rotor 92 than to the longitudinal center of the piezoelectric element 912, and nearer to one of the convexities 914 than to the transverse center of the piezoelectric element 912. The area other than the determination electrode 912B constitutes a drive electrode 912A. The surface area of the determination electrode 912B is set to $\frac{1}{30}$th or more and $\frac{1}{7}$th or less of the surface area of the drive electrode 912A, and is more preferably set to $\frac{1}{15}$th or more and $\frac{1}{10}$th or less.

When a voltage with a specific frequency is applied to the drive electrode 912A of the piezoelectric actuator 91, oscillation is created in a longitudinal primary oscillation mode in which the piezoelectric element 912 is elongated along the longitudinal direction. At this time, since the convexities 914 are provided on both ends of the diagonal of the piezoelectric actuator 91, the piezoelectric actuator 91 as a whole is unbalanced in weight in relation to the middle line in the longitudinal direction. As a result of this imbalance, oscillation is created in a curved secondary oscillation mode in which the piezoelectric actuator 91 curves in a direction substantially perpendicular to the longitudinal direction. Therefore, the piezoelectric actuator 91 creates oscillation that combines the longitudinal primary oscillation mode and the curved secondary oscillation mode, and the convexities 914 describe a roughly elliptical arc. At this time, since the piezoelectric actuator 91 is fixed on only one of the arm sections 913 and the convexities 914 are provided at the ends of the diagonal and bear the reactive force from the rotor 92, the node of oscillation in the longitudinal primary oscillation mode and the node of oscillation in the curved secondary oscillation mode are out of alignment with the center of the piezoelectric element 912. In other words, the determination electrode 912B is formed at a position in the piezoelectric actuator 91 that includes the node of oscillation in the longitudinal primary oscillation mode and the node of oscillation in the curved secondary oscillation mode. Therefore, in the present embodiment, the vibrating body is configured from the reinforcing plate 911 and the piezoelectric element 912, and the contact section is configured from the convexities 914.

The drive electrode 912A, the determination electrode 912B, and the reinforcing plate 911 are all connected to the drive apparatus (voltage application apparatus) (not shown) by a lead wire or the like. The specific configuration of the drive apparatus is described later.

A plate spring 922 is mounted on the rotor 92, and the rotor 92 is urged towards the piezoelectric actuator 91. An appropriate frictional force is thereby created between the convexities 914 and the side of the rotor 92, resulting in satisfactory efficiency in transmitting the drive force of the piezoelectric actuator 91.

In such a timepiece 1, the piezoelectric actuator 91 creates oscillation combing the longitudinal primary oscillation mode and the curved secondary oscillation mode when a drive signal with a specific frequency is applied due to the fact that the drive apparatus controls the drive signal for the piezoelectric actuator 91. The convexities 914 oscillate while describing a roughly elliptical arc that combine these oscillation modes, and the rotor 92 is pressed on in part of this oscillation arc, whereby the rotor 92 is rotatably driven.

As seen in FIGS. 1 and 2, the rotational movement of the rotor 92 is transmitted to the date turning intermediate wheel 94, and when the teeth of the date turning wheel 95 mesh with the notch 943, the date turning wheel 95 is rotated by the date turning intermediate wheel 94, which rotates the date wheel 93. The date displayed by the date wheel 93 is changed as a result of this rotation.

2. Drive Apparatus and Drive Method for Piezoelectric Actuator

Figure 3:
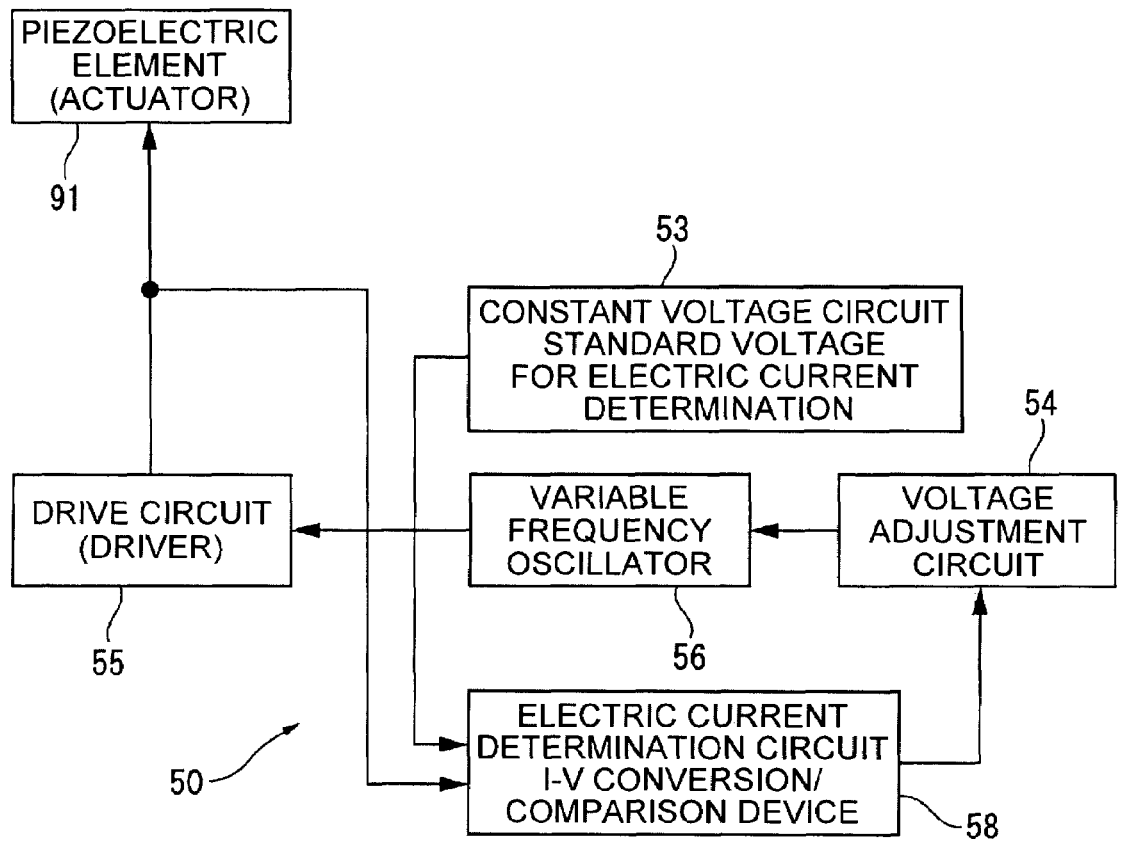
FIG. 3 is a diagrammatical block view showing the internal configuration of a drive apparatus of the piezoelectric actuator.

Next, the configuration of a drive apparatus 50 of the piezoelectric actuator 91 will be described with reference to FIG. 3. As shown in FIG. 3, the drive apparatus 50 has a drive circuit 55, a constant voltage circuit 53, an electric current determination 58, a voltage adjustment circuit 54, and a variable frequency oscillator 56. The drive circuit 55 outputs a drive signal to the piezoelectric element 912 of the piezoelectric actuator 91. The constant voltage circuit 53 outputs a standard voltage for electric current determination. The electric current determination circuit 58 determine the consumption current of the piezoelectric actuator 91 (piezoelectric element 912), converts the current to a voltage value, compares this voltage value with the standard voltage for electric current determination outputted from the constant voltage circuit 53, and outputs a comparison result signal. The voltage adjustment circuit 54 adjusts the outputted voltage on the basis of the comparison result signal from the electric current determination circuit 58. The variable frequency oscillator (VCO) 56 adjusts the frequency of the signal outputted to the drive circuit 55 according to the voltage outputted by the voltage adjustment circuit 54. The drive circuit 55 presents the piezoelectric element 912a with a drive signal correlated with the frequency of the signal inputted from the variable frequency oscillator 56.

In the present embodiment, the drive control apparatus controls the frequency of the drive signal supplied to the piezoelectric actuator 91. Further, the drive control apparatus is configured using the drive circuit 55, the variable frequency oscillator 56, and the voltage adjustment circuit 54. The frequency control device is configured using the drive control unit, the constant voltage circuit 53, and the electric current determination circuit 58.

The electric current determination circuit 58 is set to output an H (high) level comparison result signal when the voltage value based on the consumption current is equal to or greater than the standard voltage for electric current determination; that is, when the consumption current value is equal to or greater than the reference value, and to output an L (low) level comparison result signal when the consumption current value is less than the reference value.

Figure 4:
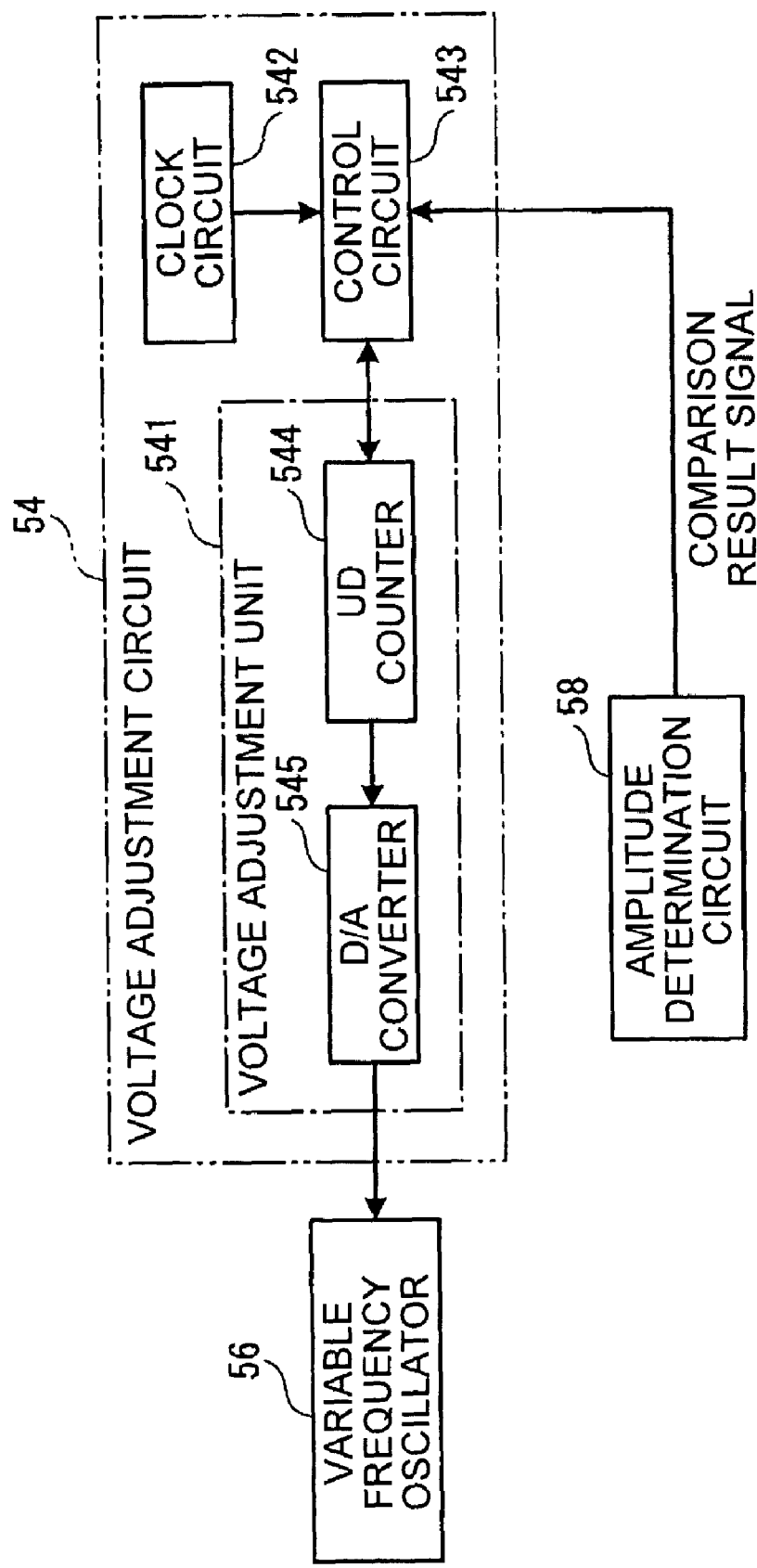
FIG. 4 is a diagrammatical block view showing the internal configuration of a voltage adjustment circuit of the drive apparatus.

The consumption current of the piezoelectric element 912, or, in other words, of the piezoelectric actuator 91, should be determined by the electric current of the drive signal outputted from the drive circuit 55. The voltage adjustment circuit 54 is configured to vary the outputted voltage within a specific range, and to shift the voltage value by a specific width based on the comparison result signal from the electric current determination circuit 58. One example of the configuration of the voltage adjustment circuit 54 is shown in FIG. 4.

The voltage adjustment circuit 54 has a voltage adjustment unit 541, a clock circuit 542, and a control circuit 543. The voltage adjustment unit 541 adjusts the voltage outputted to the variable frequency oscillator 56. The clock circuit 542 is preferably a standard signal oscillator capable of outputting clock signals (standard signals) with a plurality of frequencies. The control circuit 543 outputs a signal to the voltage adjustment unit 541 according to the clock signals outputted by the clock circuit 542.

The voltage adjustment unit 541 preferably has an up/down counter (UD counter) 544 and a digital/analog converter (D/A converter) 545 to convert digital signals outputted from the UD counter 544 into analog signals.

The control circuit 543 controls the counter value of the UD counter 544 so that the value varies within a preset range. This variation pattern may be set in advance, or may be selected from a plurality of patterns registered in advance according to the driven state and other attributes of the piezoelectric element 912. Possible suitable examples of this variation pattern include a down pattern wherein the counter value of the UD counter 544 is sequentially counted down from the maximum value to the minimum value, and returns again to the maximum value upon reaching the minimum value; an up pattern wherein the counter value of the UD counter 544 is sequentially counted up from the minimum value to the maximum value, and returns again to the minimum value upon reaching the maximum value; and a two-way pattern wherein the counter value of the UD counter 544 is counted down from the maximum value to the minimum value, then is counted up to the maximum value after reaching the minimum value, and then is counted back down to the minimum value after reaching the maximum value.

Furthermore, the control circuit 543 is configured to shift the count (counter value) of the UD counter 544 by a specific number when the comparison result signal inputted from the electric current determination circuit 58 is switched from the L level to the H level. For example, the control circuit 543 normally utilizes a specific clock signal (for example, 100 kHz) from among the clock signals outputted from the clock circuit 542 to change the counter value of the UD counter 544. However, when the comparison result signal switches from the L level to the H level, the control circuit 543 presents the UD counter 544 with a faster clock signal (for example, 1 MHz) proportionate to an X pulse, shifts the counter value by X, and then executes a process that returns to inputting the specific clock signal. Thereby, the counter vale of the UD counter 544 is normally changed by the input of a specific clock signal, but a faster clock signal is inputted with a specific number of pulses and the counter value shifts by X only when the comparison result signal switches from the L level to the H level.

To shift the counter value, a method may be used wherein an adder (during sweep up) or a subtractor (during sweep down) is used to set/reset and shift the counter value.

For the UD counter 544, a counter of about 10 bits or 12 bits can be used to input a pulse signal from the control circuit 543 to the down input or the up input of the UD counter 544, whereby the signal is counted and the counter value is changed. The bit number of the UD counter 544 should be selected according to the sweep frequency band. Specifically, when the resolution (the change in frequency when the counter value changes by 1) is about 0.01 to 0.25 kHz and the sweep frequency band is about 50 to 100 kHz, a counter of about 10 to 12 bits must be used, but if the sweep frequency band is smaller, then a counter with a smaller bit number can be used; for example, a counter of 8 or 9 bits.

In the D/A converter 545, a frequency control voltage value is set according to the counter value of the UD counter 544. The D/A converter 545 presents the variable frequency oscillator 56 with a frequency control voltage corresponding to this frequency control voltage value in accordance with the counter value when the counter value outputted from the UD counter 544 is inputted.

The variable frequency oscillator 56 outputs a frequency signal according to the voltage outputted from the D/A converter 545 to the drive circuit 55, and the drive circuit 55 outputs a drive signal with a frequency correlated with the frequency of the inputted signal to the piezoelectric element 912. Therefore, the frequency of the drive signal is set according to the counter value of the UD counter 544, and the frequency sweep rate of the drive signal is set by the rate of change of the counter value of the UD counter 544, that is, by the frequency of the clock signal used by the control circuit 543.

Therefore, the voltage adjustment circuit 54 has a frequency sweep (variation) control function to sweep or to vary the frequency of the drive signal supplied to the piezoelectric element 912 via the variable frequency oscillator 56 and the drive circuit 55, and a sweeping frequency shift control function to shift the frequency of the drive signal by a specific frequency on the basis of the comparison result signal outputted from the electric current determination circuit 58. Therefore, as the frequency control devices in the present embodiment, the frequency variation control device to control the frequency variation of the drive signal and the sweep frequency shift control device to control the frequency shift of the drive signal are configured primarily from the voltage adjustment circuit 54.

Next, the drive method of a piezoelectric actuator that uses the drive apparatus 50 will be described with reference to FIGS. 5 through 7.

Figure 5:
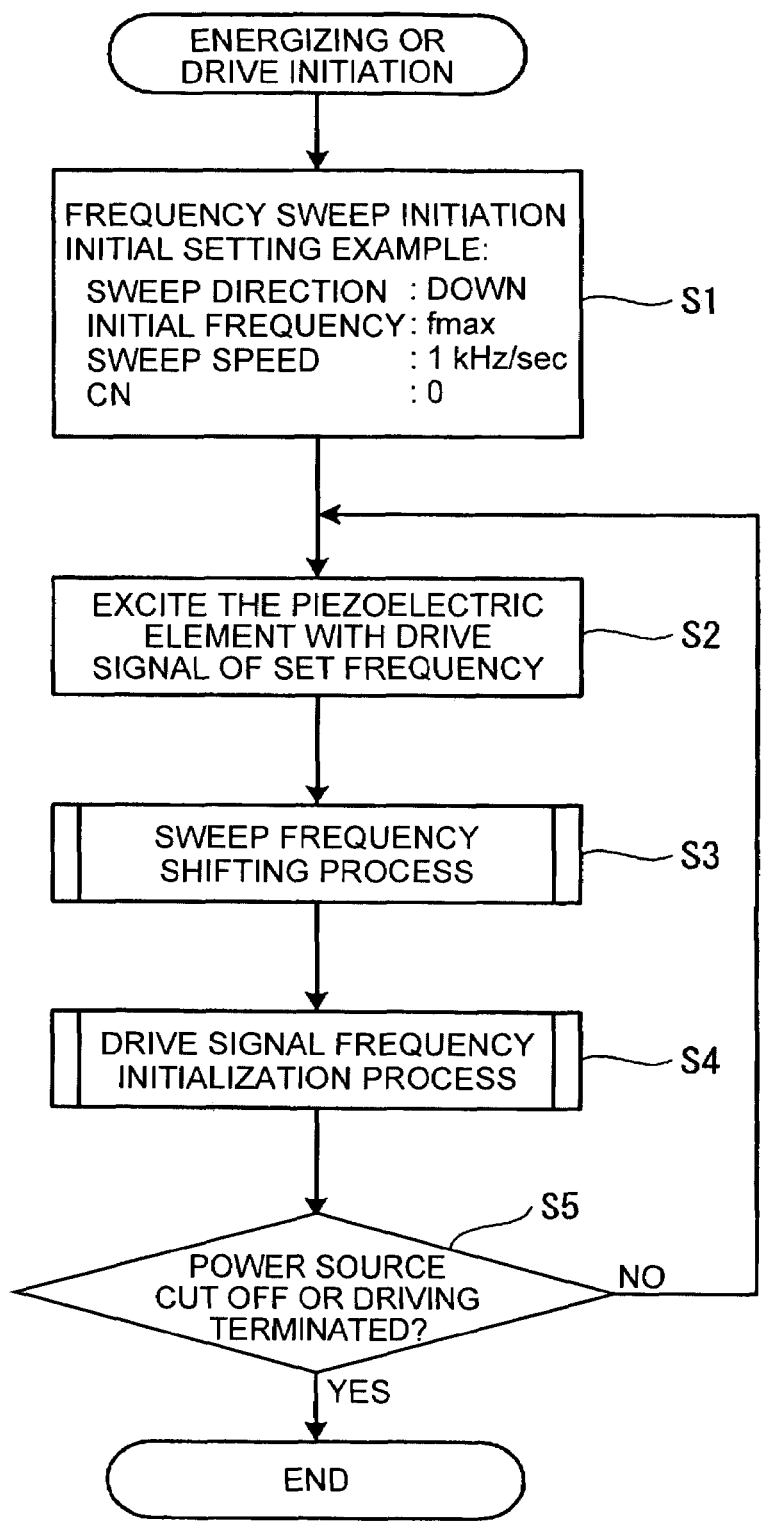
FIG. 5 is a view of a flowchart describing a method of driving the piezoelectric actuator according to the present embodiment.

As shown in FIG. 5, when an instruction is issued to energize the drive apparatus 50 or to initiate driving, the drive apparatus 50 initiates a frequency sweep for the drive signal outputted to the piezoelectric element 912 (step 1, hereinafter the steps are abbreviated as "S").

In the present embodiment, the direction of the frequency, the drive signal frequency at drive initiation, the speed, and the like are set in advance by the voltage adjustment circuit 54. For example, the sweep direction is set to DOWN (the direction in which the frequency of the drive signal is lowered), the drive signal frequency at drive initiation is set to fmax, and the sweep speed is set to a preset speed (for example, 1 kHz/sec). Therefore, the frequency of the drive signal is sequentially reduced from the MAX value of the frequency range according to the sweep speed. Further, a variable CN to determine the number of times the sweep frequency shifting process is performed is set to an initial value "0."

The frequency control of this drive signal is performed as follows. Specifically, the control circuit 543 sets the counter value of the UD counter 544 to a value corresponding to the drive signal frequency fmax, and then inputs a pulse signal to the down input of the UD counter 544 and counts down the counter value of the UD counter 544 on the basis of the clock signals from the clock circuit 542.

Since a voltage according to the counter value of the UD counter 544 is outputted from the D/A converter 545, the voltage outputted from the D/A converter 545 is reduced if the counter value of the UD counter 544 is reduced.

A signal with a frequency corresponding to the voltage value is then outputted from the variable frequency oscillator 56, and a drive signal corresponding to this frequency is outputted from the drive circuit 55 to drive and to excite the piezoelectric element 912 (S2).

When the piezoelectric element 912 is driven, the electric current determination circuit 58 and the voltage adjustment circuit 54 perform a sweep frequency shifting process based on the consumption current of the piezoelectric element 912 (S3).

Figure 6:
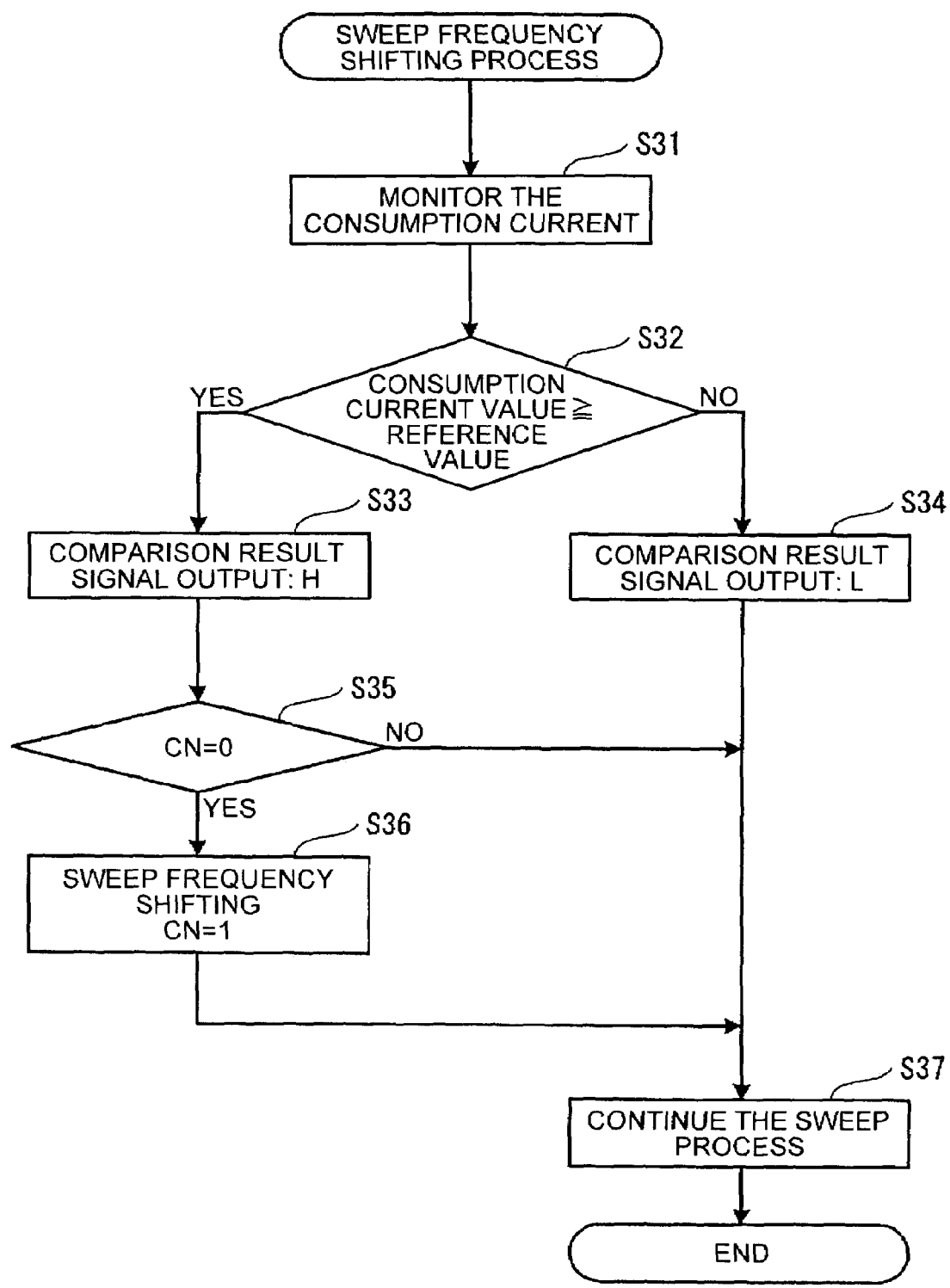
FIG. 6 is a view of a flowchart describing a method of shifting a sweep frequency in the flowchart shown in FIG. 5.

In the sweep frequency shifting process (S3), as shown in FIG. 6, the electric current determination circuit 58 monitors the consumption current of the piezoelectric element 912 (S31) and compares the consumption current with a reference value (S32). This comparison process is performed in practice by converting the consumption current to a voltage value and comparing the voltage value with the standard voltage for electric current determination outputted from the constant voltage circuit 53.

In S32, the electric current determination circuit 58 outputs an H level comparison result signal if the consumption current value is equal to or greater than the reference value (S33). Conversely, the electric current determination circuit 58 outputs an L level comparison result signal if the consumption current is less than the reference value (S34).

The voltage adjustment circuit 54 determines whether the variable CN indicating the number of shifting cycles is "0" upon receiving an H level comparison result signal (S35). When the comparison result signal is switched from the L level to the H level, CN=0, and therefore the determination is "Yes" in S35.

When the determination is "Yes" in S35, a process of shifting the sweep frequency by a specific width is performed, and the variable CN indicating the number of shifting cycles turns to "1" (S36).

When the shifting process is performed in S36, the sweep process continues (S37).

Specifically, when the comparison result signal switches from the L level to the H level, the control circuit 543 of the voltage adjustment circuit 54 inputs a fast clock signal from the clock circuit 542 to the UD counter 544 at a specific pulse, and shifts the counter value of the UD counter 544 by a specific number. Then, the voltage value outputted from the D/A converter 545 is also shifted by a specific voltage, and the frequency of the signal outputted from the variable frequency oscillator 56 is also shifted by a specific frequency (S36).

The control circuit 543 shifts the counter value of the UD counter 544 and then returns to inputting normal clock signals, whereby the sweeping of the frequency of the drive signal continues (S37). The shifting process (S36) may be performed once during a single sweep cycle, and therefore the determination in S35 is "NO" when CN=1 even if the comparison result signal is at the H level, and the sweep process is continuously performed without the shifting process (S37).

Further, the voltage adjustment circuit 54 continues to perform the sweep process unchanged if an L level comparison result signal was received in S34 (S37).

When the sweep frequency shifting process S3 is complete, a drive signal frequency initialization process S4 is performed as shown in FIG. 5.

Figure 7:
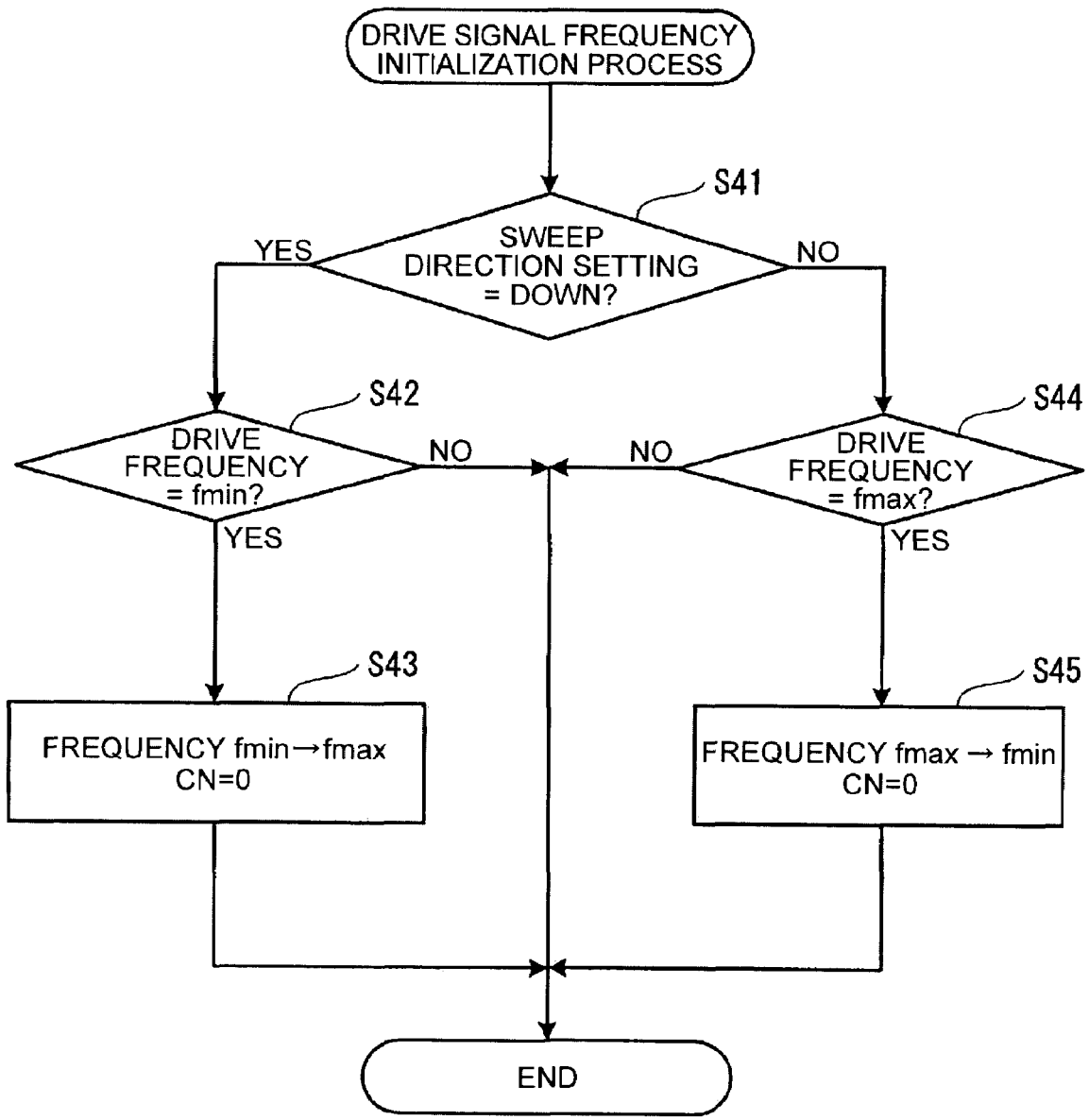
FIG. 7 is a view of a flowchart describing a method of initializing a drive signal frequency shown in the flowchart in FIG. 5.

In the drive signal frequency initialization process S4, as shown in FIG. 7, the control circuit 543 of the voltage adjustment circuit 54 confirms the setting of the sweep direction (S41). If the sweep direction is DOWN, the control circuit 543 determines whether the drive frequency is at the minimum value (fmin) of a specific frequency range (S42). Specifically, the frequency of the drive signal corresponds to the counter value of the UD counter 544, and therefore the control circuit 543 confirms the counter value of the UD counter 544 and determines whether the drive frequency is at the minimum value.

If the sweep direction is DOWN and the drive frequency is at the minimum value, the control circuit 543 changes the drive frequency to the maximum value (fmax) (S43). Specifically, the control circuit 543 changes the counter value of the UD counter 544 to a counter value corresponding to the maximum value of the drive frequency. Further, the variable CN is returned to "0."

Further, in S42, if the drive frequency has not reached the minimum value, the drive signal frequency initialization process S4 is completed without performing the initialization process on the frequency.

In the present embodiment, the sweep direction was set to DOWN, but if it is set to UP, the determination in S41 is "No," and therefore the control circuit 543 determines whether the drive frequency is at the maximum value (fmax) of a specific frequency range (S44). Specifically, the control circuit 543 confirms the counter value of the UD counter 544 to determine whether the drive frequency is at the maximum value.

If the sweep direction is UP and the drive frequency is at the maximum value, the control circuit 543 changes the drive frequency to the minimum value (fmin) and sets CN to 0 (S45). Specifically, the control circuit 543 changes the counter value of the UD counter 544 to a counter value corresponding to the minimum value of the drive frequency.

Also, in S44, if the drive frequency has not reached the maximum value, the drive signal frequency initialization process S4 is completed without performing the initialization process on the frequency.

When the drive signal frequency initialization process S4 is complete, it is determined whether an instruction has been issued to turn off the power or to terminate the driving (S5). If the determination is "No" in S5, the processes in S2 through S4 are repeated. If the determination is "Yes" in S5, drive control is then completed.

Figure 8:
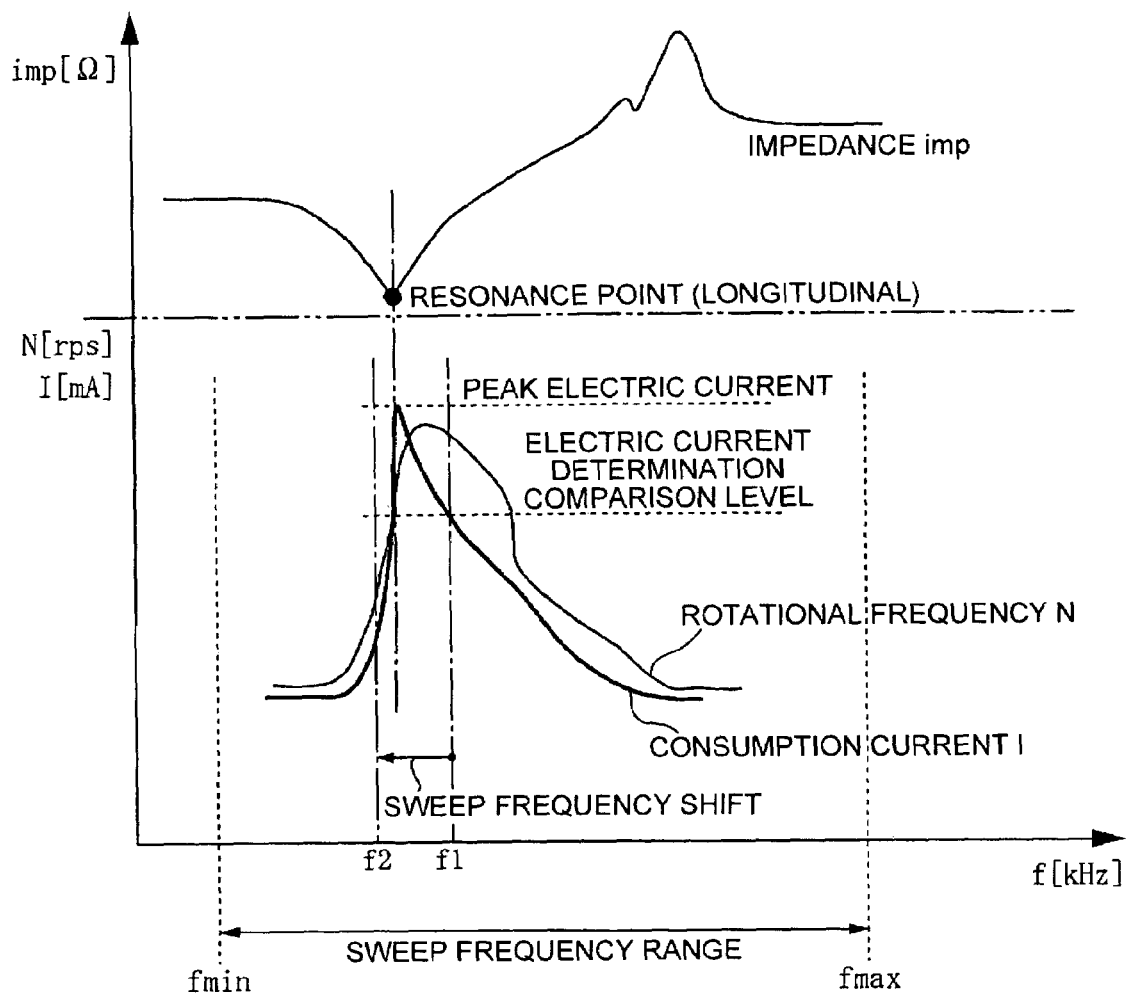
FIG. 8 is a view of a graph showing the relationship between the frequency of the drive signal and a rotational frequency of a driven member in the present embodiment.

FIG. 8 shows the relationship between the frequency of the drive signal when such control is performed, and the rotational frequency N (rps) of the driven member, the consumption current I (MA) of the piezoelectric element 912, and the impedance imp (Ω).

The frequency of the drive signal is swept in the DOWN direction from fmax to fmin. Sweeping the frequency of the drive signal makes it possible to excite reliably or to drive the piezoelectric element 912 even if the drive frequency range of the piezoelectric element 912 fluctuates according to the surrounding temperature, the load of the driven member, and other such factors.

The impedance imp of the piezoelectric element 912 is lowest at the frequency equal to the resonance point of longitudinal oscillation, as shown in FIG. 8. Therefore, the consumption current is the highest at the resonance of longitudinal oscillation where the impedance is the lowest.

As previously described, when the frequency is swept in the DOWN direction, the frequency is shifted by a specific frequency in S36 when the consumption current reaches the reference value (electric current determination comparison level), and the resonance point is increased. Specifically, the resonance frequency is increased from the frequency f1 where the consumption current reaches the standard voltage and shifts to the frequency f2.

Then, frequency sweeping continues, and when the frequency reaches fmin, the frequency returns to fmax and the sweep process is performed again.

This amount of shifting (=f1−f2) should be set in advance, normally to about several kilohertz.

4. Effects of the Embodiment

Therefore, according to the present embodiment, the following effects can be achieved.

(1) The drive apparatus 50 of the piezoelectric actuator of the present embodiment sweeps the drive signal for driving the piezoelectric element 912 within a specific frequency range, and the piezoelectric element 912 can therefore be reliably driven if it can be driven within this frequency range. Consequently, if an ultrasonic motor that uses the piezoelectric element 912 is used, the driven member can be reliably rotated.

(2) In addition, since the drive signal is normally swept within a specific frequency range, even if the drive frequency of the piezoelectric element 912 is nonuniform due to fluctuations in the surrounding temperature, noise interference, and the load, it is possible to overcome such nonuniformities without adjusting. Therefore, there is no need to provide the drive apparatus 50 with a determination circuit for determining fluctuations in the surrounding temperature, noise interference, and the load, nor is it necessary to provide an adjustment circuit for adjusting the frequency of the drive signal on the basis of such determined data, and the configuration of the drive apparatus 50 can be simplified.

(3) Furthermore, the consumption current of the piezoelectric element 912 is compared with a reference value to determine the driven state of the piezoelectric element 912, and when the consumption current is equal to or greater than the reference value, or, in other words, when the impedance is at its lowest or when the frequency of the drive signal draws near to the resonance point where the consumption current reaches its peak value, the frequency of the drive signal is shifted by a specific frequency.

Therefore, for example, the consumption current can be reduced since driving can be performed without the resonance point component in which the consumption current increases during the time required to perform a single sweep cycle in which the frequency is swept from fmax to fmin. Therefore, it is possible to prevent the occurrence of system failures due to sudden increases in the consumption current.

(4) The rotational frequency N is the highest prior to the resonance point, but is also relatively high at the point in time where the consumption current reaches the standard voltage, as shown in FIG. 8. The total rotational frequency during a single sweep cycle is an integrated value of the rotational frequency N shown in FIG. 8, so a sufficient rotational frequency can be obtained even without the sweep frequency shift component. Therefore, in the present embodiment, highly efficient rotation can be achieved while limiting the consumption current.

(5) Furthermore, in the present embodiment, since the consumption current can be limited, the generation of heat can also be limited. Therefore, it is also possible to suppress heat-induced circuit degradation, resonance frequency fluctuation, and the like.

(6) In the present embodiment, the electric current determination circuit 58 may compare the consumption current with a reference value, and the voltage adjustment circuit 54 may merely control whether or not a frequency shift is performed on the drive signal on the basis of the comparison result signal. Therefore, the circuit configuration of the drive apparatus 50 can be simplified and the control process can be easily performed.

(7) Since the voltage adjustment circuit 54 is configured using the clock circuit 542, the control circuit 543, the UD counter 544, and the D/A converter 545, the frequency shifting process can be controlled merely by changing the counter value of the UD counter 544 with the control circuit 543, and the amount of shifting can therefore be easily adjusted.

In addition, since the voltage adjustment unit 541 is configured using the UD counter 544, there is no need for externally mounted components, and the amount by which the sweep frequency is shifted can be easily varied, making it possible to fashion the components into an integrated circuit.

(8) The electronic timepiece is configured using a piezoelectric actuator 91 having: a vibrating body with a piezoelectric element 912 and a convexity 20 provided on this vibrating body and pressed against the drive object; a drive apparatus 50 with the above-described configuration; and a date display mechanism 90 driven by the piezoelectric actuator 91. Therefore, it is possible to provide an electronic timepiece that can ensure stable drive control in a short amount of time with a low consumption current.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

Second Embodiment

A second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Figure 9:
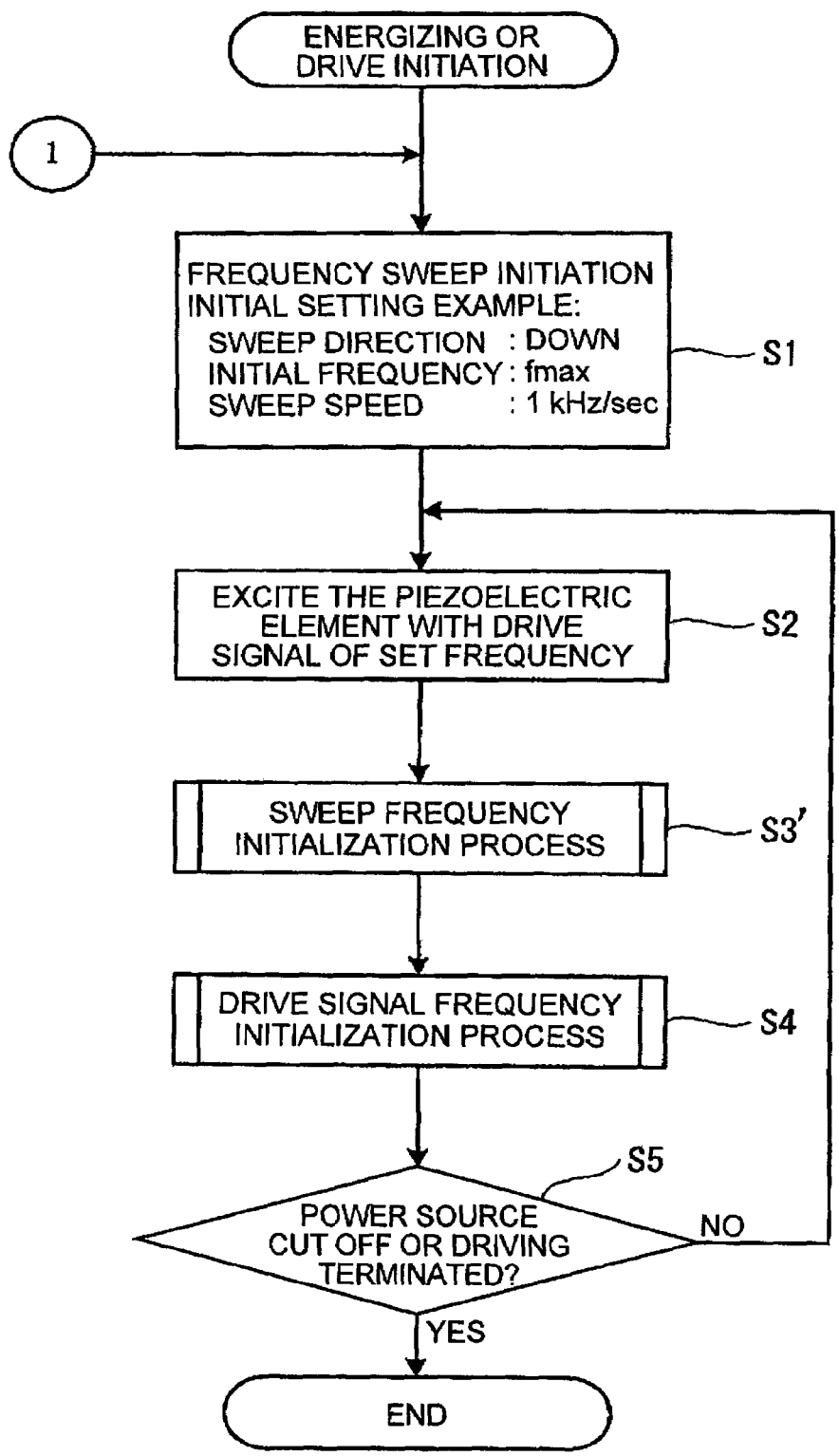
FIG. 9 is a view of a flowchart describing a method of driving a piezoelectric actuator according to a second preferred embodiment of the present invention.
Figure 10:
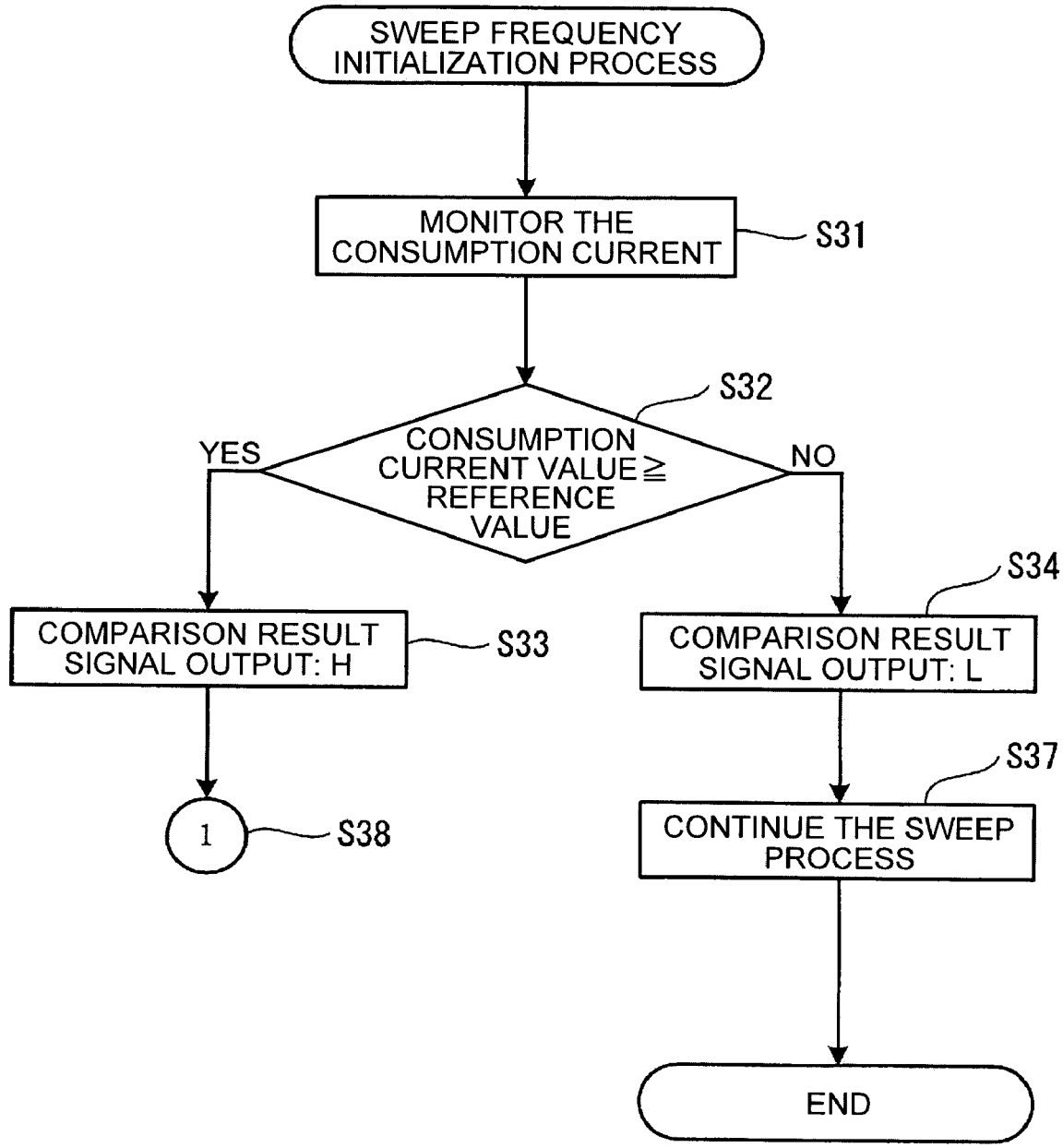
FIG. 10 is a view of a flowchart describing a method of initializing a sweep frequency shown in the flowchart in FIG. 9.

In the second embodiment, the configuration of the drive apparatus 50 of the piezoelectric actuator and the configuration of the voltage adjustment circuit 54 are identical or similar to those in the first embodiment shown in FIGS. 3 and 4. As shown in FIGS. 9 and 10, part of the drive method for the piezoelectric actuator differs from that of the first embodiment.

Specifically, as shown in FIG. 9, after an instruction is issued to energize the drive apparatus 50 or to initiate driving, the frequency sweep initiation process S1 for the drive signal and the piezoelectric element excitation process S2 are performed in the same manner as in the first embodiment.

In the second embodiment, after the piezoelectric element excitation process S2, a sweep frequency initialization process S3' is performed instead of the sweep frequency shifting process S3. Also, after S3', the drive signal frequency initialization process S4 and the power source cut-off or drive termination determination process S5 are performed, similar to the first embodiment.

As shown in FIG. 10, the sweep frequency initialization process S3' involves performing a consumption current monitoring process S31 and a process S32 to compare the consumption current and a reference value, similar to the sweep frequency shifting process S3 in the first embodiment. When the determination is "Yes" in S32 and an H level comparison result signal is outputted in S33, the process returns to S1 in FIG. 9 in S38, and the sweep frequency is initialized, that is, the sweep frequency is set to the maximum value fmax.

When the determination is "No" in S32 and an L level comparison result signal is outputted in S34, the sweep process is continued (S37).

Figure 11:
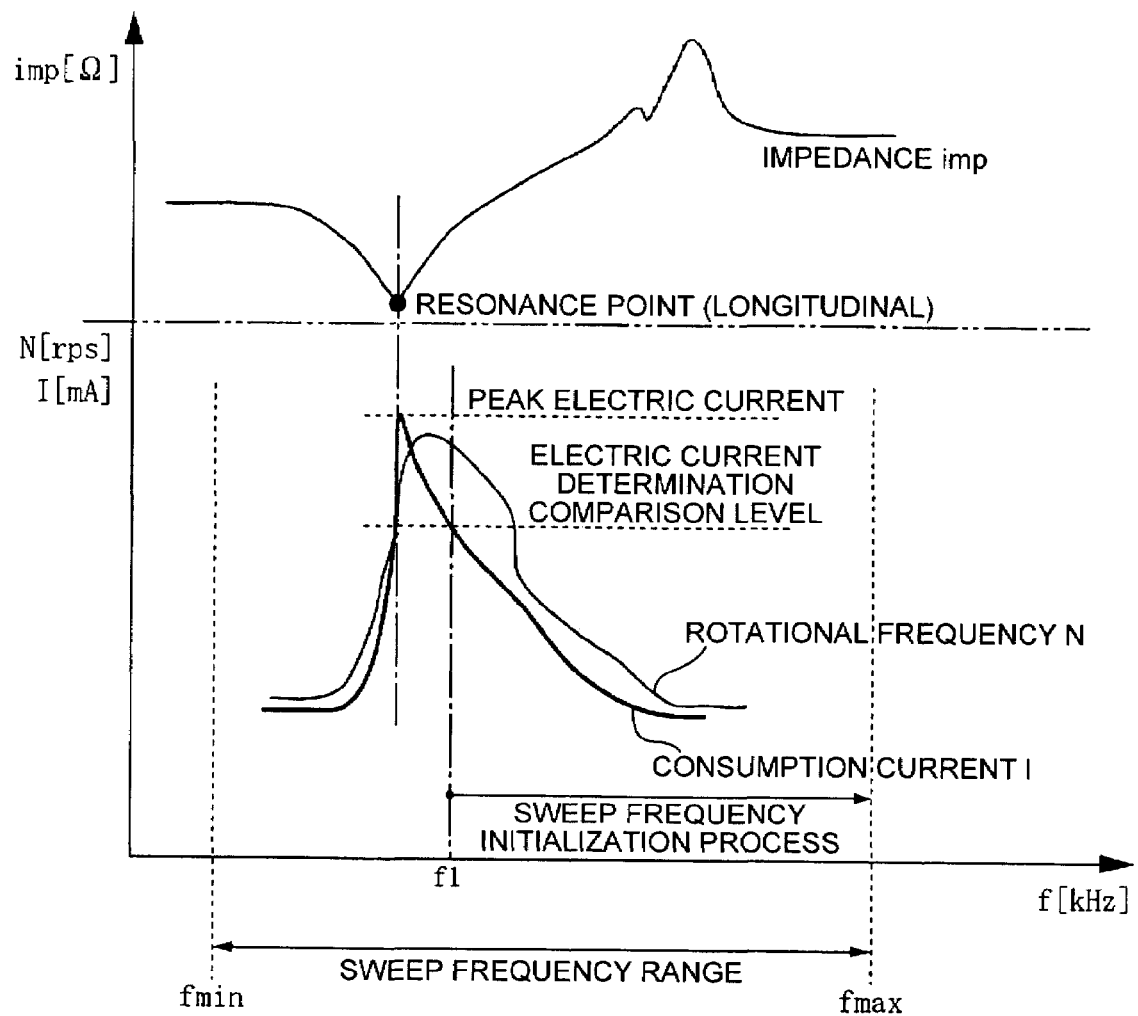
FIG. 11 is a view of a graph showing the relationship between a frequency of a drive signal and a rotational frequency of a driven member of the piezoelectric actuator of the second embodiment.

FIG. 11 shows the relationship between the frequency of the drive signal when such control is performed, and the rotational frequency N (rps) of the driven member, the consumption current I (MA) of the piezoelectric element 912, and the impedance imp ($\Omega$).

When the frequency of the drive signal is swept in the DOWN direction from fmax to fmin and the consumption current reaches the reference value (drive frequency f1), the process returns to the initialization process S1 in S38, and the drive signal also returns to the initial frequency (fmax). Since the frequency sweep continues thereafter, the frequency of the drive signal is reduced from fmax to f1 and is then returned to fmax when f1 is reached, and the sweep process is continuously repeated.

In the second embodiment, the same operational effects as the first embodiment can be achieved.

The sweep frequency of the drive signal in the second embodiment ranges from fmax to f1, while the sweep frequency in the first embodiment ranges from fmax to f1 and from the f2 to fmin, so the first embodiment has merits in that the amount by which the driven member is driven during a single sweeping cycle is greater. However, in the second embodiment, the time required for a single sweep cycle can be shortened by the amount that the frequency range is smaller. Therefore, the number of times sweeping is performed over a specific time can be increased compared with the first embodiment, and the amount by which the driven member is driven in a specific time period can be proportionately increased to be approximately equal to the first embodiment.

The present invention is not limited to the embodiments previously described, and various modifications, improvements, and the like can be included in the present invention within a range wherein the objectives of the present invention can be achieved.

For example, in the above embodiments, the consumption current was controlled only as to whether it was equal to or greater than a single reference value, but another possibility is to set a plurality of reference values and to select a reference value to be used each time. For example, as shown in FIG. 12, three reference values (electric current determination comparison levels) 1 to 3 are set, and the sweep frequency shifting process S3 or the sweep frequency initialization process S3' may be controlled with a reference value selected from these reference values 1 to 3.

If a plurality of reference values is set and selected in this manner, the speed of the driven member can be controlled and the electric current can be limited.

Figure 12:
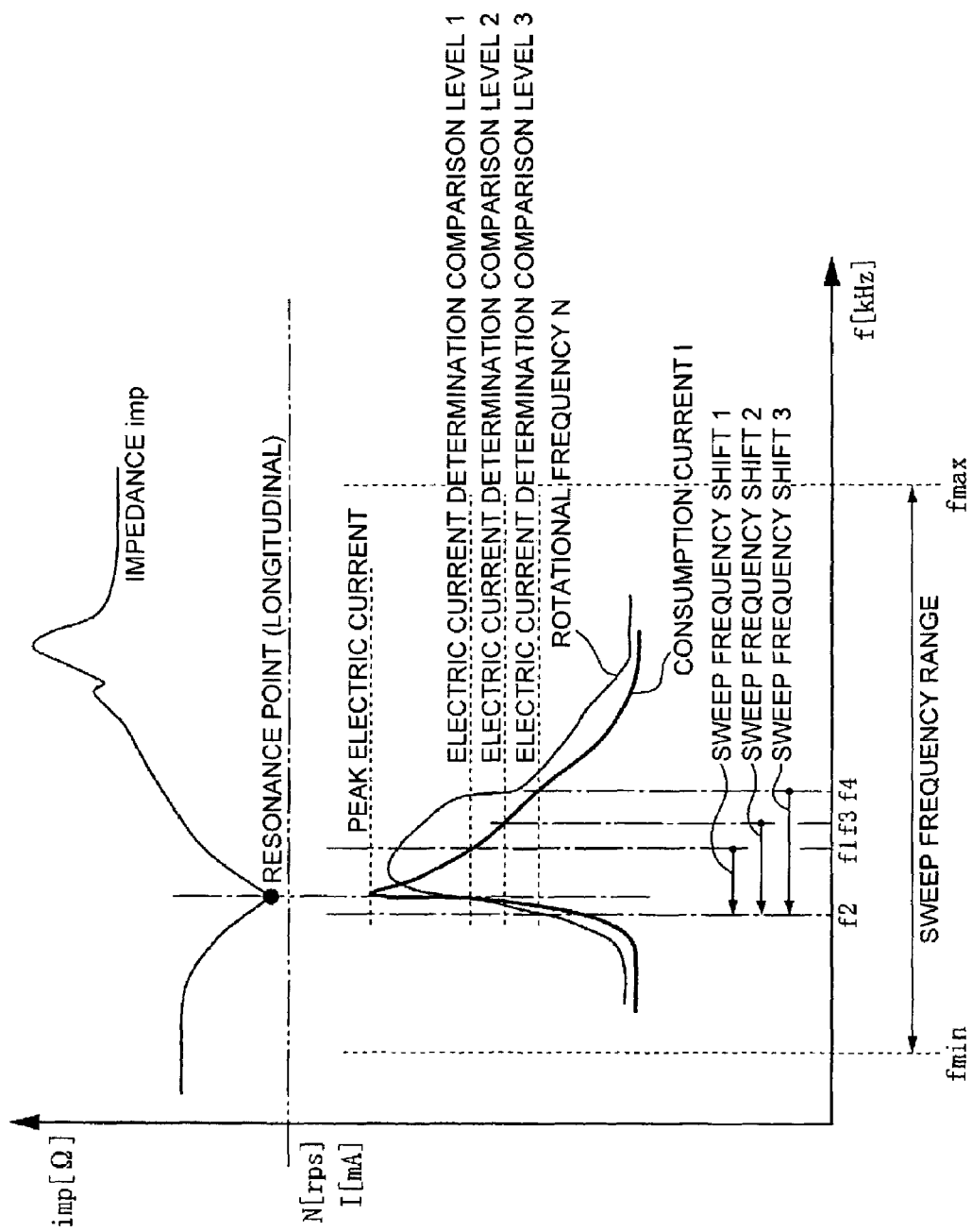
FIG. 12 is a view of a graph showing the relationship between a frequency of the drive signal and the rotational frequency of the driven member in a modification of the present invention.

In the first embodiment, the amount of shifting could be set according to the selected reference values 1 to 3, as shown in FIG. 12. Specifically, if the reference value of the consumption current decreases, the frequency of the drive signal when the reference value is reached differs from the resonance frequency. Therefore, as in the first embodiment, if the drive frequency is to be shifted to remove the resonance frequency component, the amount of shifting may be set according to the reference value.

If the reference value of the consumption current can be selected from a plurality of levels, selecting a lower reference value proportionately reduces the frequency range in which the piezoelectric element 912 is driven in order to allow the drive frequency to reach the reference value while in a state different from the resonance frequency, and the amount by which the piezoelectric element 912 is driven decreases proportionately. Consequently, selecting the reference value of the consumption current from a plurality of levels makes it possible to vary the amount by which the piezoelectric element 912 is driven in a single sweep cycle, and to control the driven amount; in other words, to control the drive rate of the driven body over a specific time.

In addition, if the reference value of the consumption current and the amount of shifting can be selected from a plurality of levels and the shifted drive frequency range can be varied, the consumption current also varies proportionately. Thus the reference value of the consumption current may be reduced when there is no need to limit the consumption current according to the power source voltage or the like. Specifically, setting the reference value of the consumption current to a specific value makes it possible to limit the consumption current to a certain value or less, and also makes it possible to prevent the occurrence of system failures due to increases in the consumption current when the power source voltage is reduced.

In addition, in the previous embodiments, the sweep rate may be varied based on the amplitude of a determination signal indicating the vibrating state (driven state) of the piezoelectric element 912. Specifically, the amplitude of the determination signal outputted from the electrode 912B of the piezoelectric element 912 increases when the piezoelectric element 912 is driven. Therefore, the amplitude of the determination signal is compared with a specific reference value, and if it is equal to or greater than the reference value, then it is possible to determine that the piezoelectric element 912 is vibrating and the drive object is being driven.

When the drive object is driven, reducing the sweep speed in comparison with the no-drive state makes it possible, for example, to extend the time during which the drive object is driven and to reduce the time during which the object is at rest during a single sweep cycle in which the frequency is swept from fmax to fmin.

Accordingly, the unproductive drive signal output time during which the drive object cannot be driven can be shortened, and needless consumption currents can therefore be reduced and efficiency improved. Further, since the time of the no-drive state can be shortened, nonuniformities during driving over a specific time of one minute or the like, for example, can be reduced, deviations (nonuniformities) in the rotating speed of the member rotatably driven by the piezoelectric element 912 can be reduced, and high speed driving can be made possible, even when fluctuations occur in the load or the like.

Figure 13:
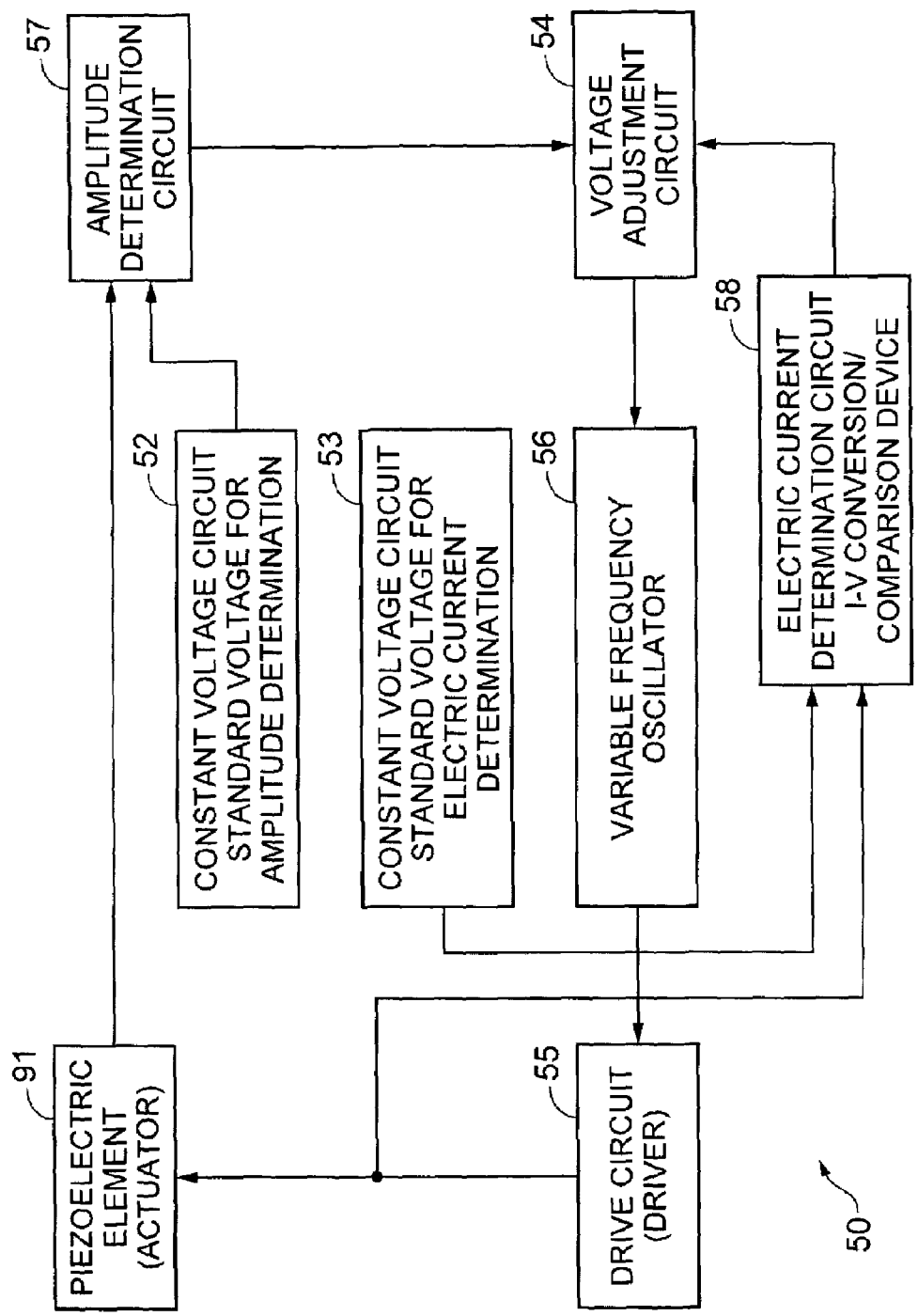
FIG. 13 is a diagrammatical block view showing the internal configuration of a drive apparatus of a piezoelectric actuator in another modification of the present invention.

When the sweep speed can be varied based on the determination signal, as shown in FIG. 13, the configuration of the previous embodiments may be expanded to include a constant voltage circuit 52 to output the standard voltage to determine the amplitude of the determination signal from the piezoelectric element 912, and an amplitude determination circuit 57 to compare the determination signal with the standard voltage, outputting an H level signal if the voltage is equal to or greater than the standard voltage, and outputting an L level signal if it is less than the standard voltage.

Figure 14:
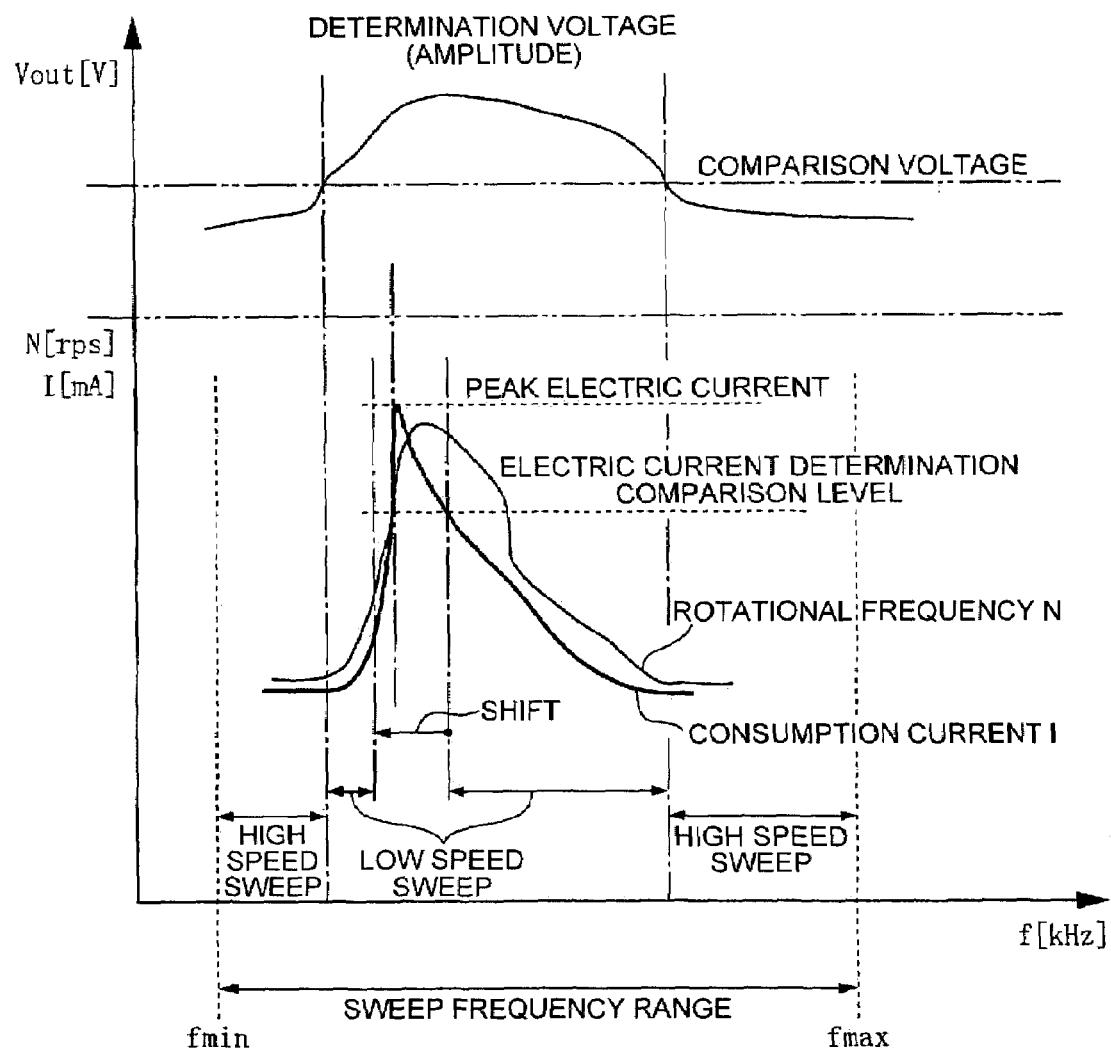
FIG. 14 is a view of a graph showing the relationship between the frequency of a drive signal and a rotational frequency of a driven member in the piezoelectric actuator in the modification shown in FIG. 13.

As shown in FIG. 14, the voltage adjustment circuit 54 could be configured to perform the sweep frequency shifting process S3 or the sweep frequency initialization process S3' on the basis of the signal from the electric current determination circuit 58, and to switch and to control the sweep speed on the basis of the signal from the amplitude determination circuit 57.

The standard voltage for use in determining the amplitude to switch the sweep speed may be set to a value at which the driven member is reliably driven, but may also be set to a value such that the frequency of the drive signal is near the frequency range in which the driven member is driven, and driving is initiated a short time thereafter. In this case sweeping can always be controlled at a low speed at a frequency range in which the driven member is driven.

In the first embodiment, the sweep pattern of the frequency of the drive signal is not limited to a down pattern in which the frequency is swept from a specific maximum frequency fmax to a minimum frequency fmin, and upon reaching the minimum frequency fmin is returned to the maximum frequency fmax and is again swept towards the minimum frequency fmin as in the previous embodiments. Another possibility is to employ an up pattern wherein the frequency is always swept from the minimum frequency fmin to the maximum frequency fmax, or a two-way pattern wherein the frequency is swept up to the maximum value after reaching the minimum value, and then is swept back down to the minimum value after reaching the maximum value.

In addition, the configuration may be designed such that these sweeping patterns are selected based on the driven state of the piezoelectric element 912.

In the second embodiment, the drive frequency is swept from a specific maximum frequency fmax, and is then is returned to the maximum frequency fmax when the consumption current reaches a reference value, but another possibility is to perform the sweep process to increase the drive frequency from a specific minimum frequency fmin, and to initialize the drive frequency back to the minimum frequency fmin when the consumption current reaches a reference value.

The drive apparatus 50 is not limited to one that uses a voltage adjustment circuit 54 having the UD counter 544, but may be one that has a voltage adjustment circuit with a plurality of loop filters having different time constants. In summary, the apparatus may be one wherein the frequency of the drive signal outputted from the drive circuit 55 to the piezoelectric element 912 can be swept, the drive frequency can be shifted by a specific amount, and the apparatus can return to its initial state.

Any specific configuration can be used as long as the electric current determination circuit 58 can determine the consumption current of the piezoelectric element 912 and compare it with a reference value.

Furthermore, each device in the control unit may be configured from various logic elements or other such hardware, or may be configured so that the devices are realized by providing a computer that contains a CPU, (central processing unit), memory (storage device), and the like to a timepiece or portable device, and incorporating specific programs or data (data stored in the storage sections) into this computer.

The programs and data may be stored in advance in RAM, ROM, or other such memory incorporated into the timepiece or portable device. Also, for example, specific control programs or data may be installed in the timepiece or portable device via the Internet or another such communication device, or a CD-ROM, memory card, or other such storage medium. The devices may be realized by causing the CPU or the like to operate with a program stored in the memory. To install a specific program or the like in the timepiece or portable device, a memory card, CD-ROM, or the like may be directly inserted into the timepiece or portable device, or a device for reading these storage media may be connected to the timepiece or portable device by external mounting. Furthermore, a LAN cable, phone line, or the like may be connected to the timepiece or portable device to load and install a program or the like via wired communication, or the program may be loaded and installed via wireless communication.

If a control program or the like provided by a storage medium, the Internet, or another such communication device is incorporated into the timepiece or portable device, the functions of the present invention can be performed merely by modifying the program so the control program can be selected and incorporated during factory shipping or as desired by the user. In this case, various timepieces and portable devices with different control systems can be manufactured merely by modifying the program, making it possible to share the components and to reduce greatly manufacturing costs when the products are modified.

Further, the present invention is not limited to being applied to the electronic timepiece described in the previous embodiments. Specifically, the drive method for a piezoelectric actuator according to the present invention or the electronic timepiece that employs the drive apparatus is not limited to a wristwatch, standing clock, wall clock, or other such electronic timepieces, and the present invention can be applied to various electronic devices and is particularly suitable for portable electronic devices for which compactness is a requirement. Examples of such electronic devices include phones, portable phones, personal computers, portable information terminals (PDA), cameras, and other devices with timepiece functions. The present invention can also be applied to film cameras, digital cameras, video cameras, portable phones with camera functions, and other such electronic devices that do not have a timepiece function. When the present invention is applied to electronic devices with a camera function, the drive device of the present invention can be used to drive a focusing mechanism, a zoom mechanism, a lens adjusting mechanism, or the like. Furthermore, the drive device of the present invention may also be used in a drive mechanism for a meter pointer in a measurement device, a drive mechanism in a mobile toy, a drive mechanism for a meter pointer in an instrumental panel in an automobile or the like, a piezoelectric buzzer, a printer inkjet head, an ultrasonic motor, or the like.

Also, a piezoelectric actuator was used to drive the date display mechanism of the electronic timepiece 1 in the first embodiment, but the actuator not limited to this option alone and may also be used to drive time display hands (pointers) in the electronic timepiece 1. Thus, replacing the stepping motor normally used to drive the pointers with a piezoelectric actuator allows the electronic timepiece 1 to be designed as a single thin layer and to be made highly antimagnetic because the piezoelectric actuator is less susceptible to magnetism than the stepping motor.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A drive method for a piezoelectric actuator comprising:
    attaching a piezoelectric actuator having
        a vibrating body being configured to be vibrated by application of a drive signal having a specific frequency to a piezoelectric element, and
        a contact section being provided on said vibrating body and being arranged to be pressed against a drive object on a plate;
    supplying a drive signal frequency to said piezoelectric element, said drive signal frequency being swept over a specific range;
    determining and finding a consumption current of said piezoelectric element to be equal to or greater than a reference value; and
    shifting said drive signal frequency by a specific frequency in order to avoid a resonance frequency while continuing to sweep said drive signal frequency over said entire specific range.

2. The drive method for a piezoelectric actuator according to claim 1, wherein
    said reference value is configured to be switched among a plurality of levels.

3. The drive method for a piezoelectric actuator according to claim 2, further comprising,
    determining a determination signal to express a vibrating state of said vibrating body,
    determining a driven state in which said vibrating body vibrates to drive said drive object, or determining a resting state in which the drive object is not driven based on said determination signal, and
    setting a sweep speed of said drive signal frequency when said drive object is in a drive state lower than a speed when the drive object is in a resting state.

4. The drive method for a piezoelectric actuator according to claim 1, further comprising,
    determining a determination signal to express a vibrating state of said vibrating body,
    determining a driven state in which said vibrating body vibrates to drive said drive object, or determining a resting state in which the drive object is not driven based on said determination signal, and
    setting a sweep speed of said drive signal frequency when said drive object is in a drive state lower than a speed when the drive object is in a resting state.

5. The drive method for a piezoelectric actuator according to claim 1,
said consumption current is found in said resonance frequency.

6. A drive method for a piezoelectric actuator comprising:
attaching a piezoelectric actuator having
a vibrating body being configured to be vibrated by the application of a drive signal having a specific frequency to a piezoelectric element, and
a contact section being provided on the vibrating body and pressed against a drive object on a plate;
supplying a drive signal frequency to said piezoelectric element being swept over a specific range;
determining and finding a consumption current of said piezoelectric element to be equal to or greater than a reference value; and
returning said drive signal frequency to an initial value in order to avoid a resonance frequency while continuing to sweep said drive signal frequency over said entire specific range.

7. The drive method for a piezoelectric actuator according to claim 6, wherein
said reference value is configured to be switched among a plurality of levels.

8. The drive method for a piezoelectric actuator according to claim 7, further comprising,
determining a determination signal to express a vibrating state of said vibrating body,
determining a driven state in which said vibrating body vibrates to drive said drive object, or determining a resting state in which the drive object is not driven based on said determination signal, and
setting a sweep speed of said drive signal frequency when said drive object is in a drive state lower than a speed when the drive object is in a resting state.

9. The drive method for a piezoelectric actuator according to claim 6, further comprising,
determining a determination signal to express a vibrating state of said vibrating body,
determining a driven state in which said vibrating body vibrates to drive said drive object, or determining a resting state in which the drive object is not driven based on said determination signal, and
setting a sweep speed of said drive signal frequency when said drive object is in a drive state lower than a speed when the drive object is in a resting state.

10. A piezoelectric actuator comprising:
a piezoelectric element having,
a vibrating body being configured to be vibrated by the application of a drive signal having a specific frequency to said piezoelectric element, and
a contact section being provided to said vibrating body and being configured to be pressed against a drive object; and
a drive apparatus having a frequency control device being configured to sweep a frequency of said drive signal supplied to said piezoelectric element over a specific range, said frequency control device being configured to shift said frequency of said drive signal by a specific frequency in order to avoid a resonance frequency and to continue to sweep said frequency over said entire specific range when a consumption current of said piezoelectric element is determined and found to be equal to or greater than a reference value.

11. The piezoelectric actuator according to claim 10, wherein
said frequency control device is configured to switch said reference value among a plurality of levels.

12. The piezoelectric actuator according to claim 10, wherein
said frequency control device detects a determination signal to express a vibrating state of said vibrating body, and determines a driven state in which said vibrating body vibrates to drive said drive object, or determines a resting state in which said drive object is not driven on the basis of the determination signal, and
a sweep speed of said drive signal frequency is set to be lower when said drive object is in a driven state than a sweep speed when said drive object is in a resting state.

13. The piezoelectric actuator according to claim 10, wherein
said frequency control device includes,
a constant voltage circuit to output a standard voltage for an electric current determination to determine whether said consumption current is equal to or greater than a reference value, an electric current determination circuit that converts the consumption current to a voltage value, to compare a voltage value with a standard voltage for said electric current determination, and to output a comparison result signal,
a voltage adjustment circuit to adjust outputted voltage on the basis of said comparison result signal, and
a variable frequency oscillator configured to vary a frequency of an outputted signal by voltage outputted from said voltage adjustment circuit.

14. The piezoelectric actuator according to claim 13, wherein
said voltage adjustment circuit includes
a clock circuit to output a clock signal,
an up/down counter,
a digital/analog converter to set a voltage value of said outputted voltage on the basis of a counter value of said up/down counter, and
a control circuit to control a counter value of said up/down counter on the basis of said clock signal, and
said control circuit varies said counter value of said up/down counter on the basis of said comparison result signal.

15. An electronic device comprising a piezoelectric actuator according to claim 10.

16. A piezoelectric actuator comprising:
a piezoelectric element having,
a vibrating body being configured to be vibrated by the application of a drive signal having a specific frequency to said piezoelectric element, and
a contact section being provided to said vibrating body and being configured to be pressed against a drive object; and
a drive apparatus having a frequency control device being configured to sweep a frequency of said drive signal supplied to said piezoelectric element over a specific range, said frequency control device being configured to return said drive signal to an initial value in order to avoid a resonance frequency and to continue to sweep said frequency over said entire specific range when a consumption current of said piezoelectric element is determined and found to be equal to or greater than a reference value.

17. The piezoelectric actuator according to claim 16, wherein said frequency control device is configured to switch said reference value among a plurality of levels.

18. The piezoelectric actuator according to claim 16, wherein said frequency control device detects a determination signal to express a vibrating state of said vibrating body, and determines a driven state in which said vibrating body vibrates to drive said drive object, or determines a resting state in which said drive object is not driven on the basis of the determination signal, and a sweep speed of said drive signal frequency is set to be lower when said drive object is in a driven state than a sweep speed when said drive object is in a resting state.

19. The piezoelectric actuator according to claim 16, wherein said frequency control device includes, a constant voltage circuit to output a standard voltage for an electric current determination to determine whether said consumption current is equal to or greater than a reference value, an electric current determination circuit that converts the consumption current to a voltage value, to compare a voltage value with a standard voltage for said electric current determination, and to output a comparison result signal, a voltage adjustment circuit to adjust outputted voltage on the basis of said comparison result signal, and a variable frequency oscillator configured to vary a frequency of an outputted signal by voltage outputted from said voltage adjustment circuit.

20. The piezoelectric actuator according to claim 19, wherein said voltage adjustment circuit includes a clock circuit to output a clock signal, an up/down counter, a digital/analog converter to set a voltage value of said outputted voltage on the basis of a counter value of said up/down counter, and a control circuit to control a counter value of said up/down counter on the basis of said clock signal, and said control circuit varies said counter value of said up/down counter on the basis of said comparison result signal.

21. An electronic device comprising a piezoelectric actuator according to claim 16.

22. A computer comprising:

a recordable medium; and a control program being configured to be recorded on said recordable medium and to run on the computer, said control program having code for configuring a drive apparatus having, a frequency control device of a piezoelectric actuator having, a vibrating body being configured to be vibrated by application of a drive signal having a specific frequency to a piezoelectric element, and a contact section being provided on said vibrating body and being arranged to be pressed against a drive object to sweep a frequency of said drive signal supplied to said piezoelectric element over a specific range, and code for configuring said frequency control device to shift said frequency of said drive signal by a specific frequency in order to avoid a resonance frequency and to continue to sweep said frequency over said entire specific range when a consumption current of said piezoelectric element is determined and found to be equal to or greater than a reference value.

23. A computer comprising:

a recordable medium;

a control program being configured to be recorded on said recordable medium and to run on the computer having code for configuring a drive apparatus having, a frequency control device of a piezoelectric actuator having, a vibrating body being configured to be vibrated by application of a drive signal having a specific frequency to a piezoelectric element, and a contact section being provided on said vibrating body and being arranged to be pressed against a drive object to sweep a frequency of said drive signal supplied to said piezoelectric element over a specific range, and code for configuring said frequency control device to return said drive signal to an initial value by a specific frequency in order to avoid a resonance frequency and to continue to sweep said frequency over said entire specific range when a consumption current of said piezoelectric element is determined and found to be equal to or greater than a reference value.

* * * * *